US010796229B1

(12) United States Patent
Paliwal et al.

(10) Patent No.: US 10,796,229 B1
(45) Date of Patent: Oct. 6, 2020

(54) BUILDING AN INTERACTIVE KNOWLEDGE LIST FOR BUSINESS ONTOLOGIES

(71) Applicant: InsideView Technologies, Inc., San Francisco, CA (US)

(72) Inventors: Abhay Kumar Paliwal, Bhopal (IN); Jason Muldoon, San Francisco, CA (US)

(73) Assignee: INSIDEVIEW TECHNOLOGIES, INC., San Francisco, CA (US)

( * ) Notice: Subject to any disclaimer, the term of this patent is extended or adjusted under 35 U.S.C. 154(b) by 1127 days.

(21) Appl. No.: 15/012,695

(22) Filed: Feb. 1, 2016

(51) Int. Cl.
G06N 5/02 (2006.01)
(52) U.S. Cl.
CPC ................... G06N 5/022 (2013.01)
(58) Field of Classification Search
CPC ..................................... G06N 5/022
See application file for complete search history.

(56) References Cited

U.S. PATENT DOCUMENTS

| 7,774,791 | B1* | 8/2010 | Appelbaum | G06Q 10/06 719/318 |
| 2004/0133342 | A1* | 7/2004 | Banker | G06Q 10/10 701/532 |
| 2004/0138934 | A1* | 7/2004 | Johnson | G06Q 10/06 705/7.36 |
| 2004/0249644 | A1* | 12/2004 | Schiefer | G06Q 10/06375 705/7.37 |
| 2005/0120009 | A1* | 6/2005 | Aker | G06F 16/84 |
| 2007/0038500 | A1* | 2/2007 | Hammitt | G06N 5/02 705/7.11 |
| 2008/0195463 | A1* | 8/2008 | Aggour | G06Q 10/00 705/35 |
| 2008/0301175 | A1* | 12/2008 | Applebaum | G06F 16/24565 |
| 2009/0150319 | A1* | 6/2009 | Matson | G06N 5/025 706/47 |

(Continued)

OTHER PUBLICATIONS

Aino Halinen et al, Network process analysis: An event-based approach to study business network dynamics, Nov. 2013, / Industrial Marketing Management 42 (2013) 1213-1222 (Year: 2013).*

(Continued)

Primary Examiner — Andre D Boyce
(74) Attorney, Agent, or Firm — Patent Law Works LLP

(57) ABSTRACT

A system and method for collecting data analytics on the one or more business events, receiving a prior set of knowledge about the one or more business events, generating, for presentation to the user, the timeline of the set of relevant information on the one or more business events based on processing the data analytics in combination with the prior set of knowledge, generating a current hypothesis for the one or more business events associated with the one or more business ontologies associated with the one or more business events, the current hypothesis modifying the prior set of knowledge over a period of time, receiving a natural language query from the user for interacting with the timeline of the set of relevant information and the current hypothesis, and generating, for presentation to the user, a response from the timeline of the set of relevant information and the current hypothesis.

20 Claims, 15 Drawing Sheets

(56) References Cited

U.S. PATENT DOCUMENTS

| | | | | |
|---|---|---|---|---|
| 2009/0228343 A1* | 9/2009 | Ford | .................. | G06Q 10/0833 |
| | | | | 705/7.29 |
| 2010/0174754 A1* | 7/2010 | B'Far | ..................... | G06Q 10/10 |
| | | | | 707/794 |
| 2011/0047056 A1* | 2/2011 | Overman | ............... | G06Q 40/00 |
| | | | | 705/35 |
| 2011/0055239 A1* | 3/2011 | Wolf | ................. | G06F 16/24568 |
| | | | | 707/759 |
| 2011/0093469 A1* | 4/2011 | B'Far | .................... | G06F 16/254 |
| | | | | 707/741 |
| 2011/0154367 A1* | 6/2011 | Gutjahr | ................... | G06F 9/542 |
| | | | | 719/316 |
| 2011/0302171 A1* | 12/2011 | Waldo | ................... | G06F 16/353 |
| | | | | 707/740 |
| 2014/0095473 A1* | 4/2014 | Srinivasan | ........ | G06F 16/24568 |
| | | | | 707/718 |
| 2014/0143793 A1* | 5/2014 | Chang | .................... | G06F 11/30 |
| | | | | 719/318 |
| 2015/0310446 A1* | 10/2015 | Tuchman | ............. | G06Q 30/016 |
| | | | | 705/304 |
| 2016/0154692 A1* | 6/2016 | Heinz | ................. | G06F 11/0772 |
| | | | | 714/2 |
| 2017/0063762 A1* | 3/2017 | Machol | ................... | H04L 51/18 |
| 2017/0235820 A1* | 8/2017 | Conrad | .............. | G06F 17/2211 |
| | | | | 707/728 |

OTHER PUBLICATIONS

Michael Gruninger et al, Ontologies to Support Process Integration in Enterprise Engineering, Computational & Mathematical Organization Theory 6, 381-394, 2000 (Year: 2000).*

* cited by examiner

|  | Acquisition 302 | New Offering 304 | Partnership 306 | Leadership Change 308 |
|---|---|---|---|---|
|  | X | X | X | X |
|  | X | X | X | X |
|  | X | X | X | X |
|  | X | X | X | X |
|  | X | X | X | X |
|  | X | X | X | X |

310 — ACQUISITION: Sub Categories
- Merge
- Acquire
- Negotiation
- Subsidiary
- Acquiring child co.
- Litigation NEW OFFERINGS: Sub Categories
- Launch
- Re-Launch
- Version Release
- Upgradation
- Pre-Launch PARTNERSHIP: Sub Categories
- Expanding Partnership
- Signing a new Agreement
- Joint Venture
- Co. Working on same project
- Strategic Alliance
- Sponsorship
- Termination of Partnership LEADERSHIP CHANGE: Sub Categories
- Hiring
- Promotion
- Resignation
- Deceased Alerts
- Retirements
- Elections
- Termination of Exec

Figure 3

Lenovo buys Motorola becoming world's third largest smartphone producer
*Published time: 30 Oct, 2014 16:07*

Chinese giant PC producer Lenovo has completed the $2.9 billion acquisition of the handset unit in the iconic mobile maker Motorola Mobility, fortifying its positions in the US and other developed markets.

Beijing-based Lenovo Group bought Motorola from Google, the deal elevating it to the world's third largest smartphone producer, moving Xiaomi Corp., another Chinese smartphone maker better known in the West as 'Mi', to the fourth position.

"By building a strong number three and a credible challenger to the top two in smartphones, we will give the market something it has needed: choice, competition and a new spark of innovation", Lenovo CEO Yang Yuanqing said in a statement on the company's website.

The $2.9 billion deal also adds to a squall of activity aimed at transforming Lenovo, the world's number one PC manufacturer, into a major producer of smartphones and wireless devices.
Yuanqing says Motorola provides a shortcut for entering mature markets and will make the Chinese company "a global player."

Rick Osterloh, President of Motorola Mobility, will remain in his role. And the company, with its total of 3,500 employees, will become a fully-owned subsidiary of Lenovo, but will continue to be headquartered in Chicago. Lenovo has headquarters in Morrisville, NC, Beijing, and Singapore.

Google acquired Motorola in 2012 for $12.4 billion, but failed to bring the iconic mobile maker back to growth. Lenovo claims it would revive the firm within the next 18 months, as it expects to sell about 100 million devices this year.

Meanwhile, the company retains ownership of the bulk of Motorola's patent portfolio, with Lenovo having an option to license patents. Some 2,000 patents and a large number of patent cross-licensing deals will go with Motorola to Lenovo.

Reuters/Kim Kyung-Hoon / Reuters

Figure 4

BUILDING AN INTERACTIVE KNOWLEDGE LIST FOR BUSINESS ONTOLOGIES

FIELD OF THE INVENTION

The present disclosure relates to digital data processing. More particularly, the present disclosure relates to digital data processing for building an interactive knowledge list for enterprises based on user request.

BACKGROUND

In the existing technology of big data analytics, the primary aim seems to center around determining and presenting approximate relevance of the information found in structured or semi-structured content to the user. Most of the inventions mainly process content from multiple heterogeneous big data sources using various data analytical tools to derive insights about the data. It would be beneficial to extend the data abstraction from just mere informed data to knowing the data in order to frame a coherent picture from the diverse set of information. However, such extension of data abstraction is absent in the existing technology.

Another deficiency in the existing technology is that most intelligent data analytics tools present the user with derived abstraction from big data but fail to provide the user with a set of original content or documents from which the abstraction was derived. For example, if a user is informed that a particular news is trending at the moment, it is not justifiable to leave the user with no chance to be informed in detail. The trending news should be supplemented with original document so that the user can corroborate the trending news. However, such a framework for providing not only an abstraction derived from big data but also a right set of supplementing documents for corroboration by the user is unfortunately absent in the present technology.

The present disclosure corrects one or more of the above deficiencies of existing solutions related to building a knowledge around the data.

SUMMARY OF THE INVENTION

According to one aspect of the invention there is provided a computer implemented method and system executed by one or more computing devices. The method comprises the steps of: receiving a request from a user to generate a timeline of a set of relevant information on one or more business events associated with one or more business ontologies, collecting data analytics on the one or more business events, receiving a prior set of knowledge about the one or more business events, generating, for presentation to the user, the timeline of the set of relevant information on the one or more business events based on processing the data analytics in combination with the prior set of knowledge, generating a current hypothesis for the one or more business events associated with the one or more business ontologies, the current hypothesis modifying the prior set of knowledge over a period of time, receiving a natural language query from the user for interacting with the timeline of the set of relevant information and the current hypothesis, and generating, for presentation to the user, a response from the timeline of the set of relevant information and the current hypothesis.

It should be understood that the above is not all-inclusive and many additional steps, features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

FIG. 3 illustrates an example table for a category-subcategory matrix, according to one embodiment.

FIG. 4 is an example graphical representation of a piece of news document from a news data source, according to one embodiment.

DETAILED DESCRIPTION

Figure 1:
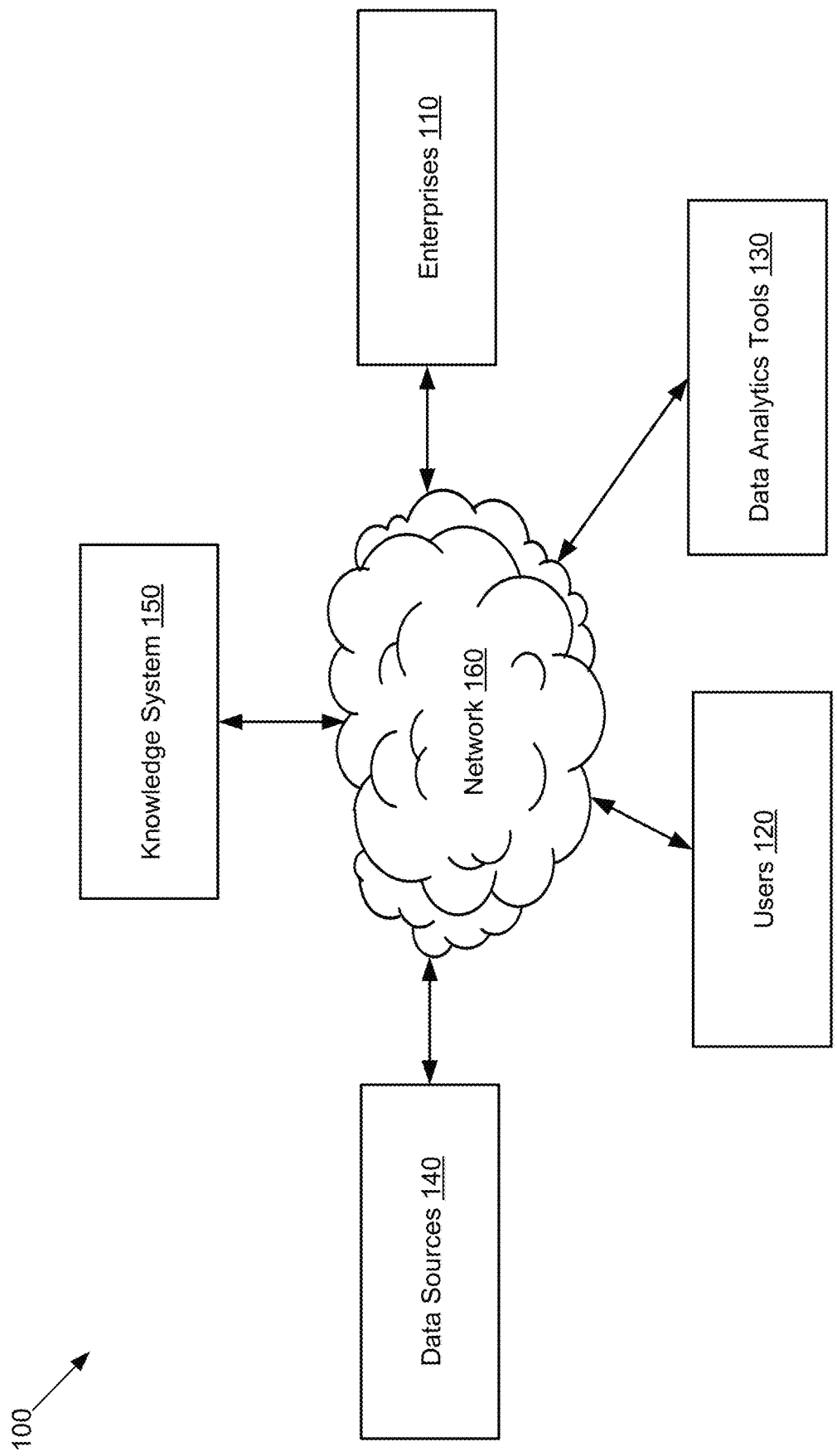
FIG. 1 illustrates an example computing environment in which a knowledge system generates a knowledge list for enterprises and members of enterprises, according to one embodiment.

The innovation is now described with reference to the drawings, wherein like reference numerals are used to refer to like elements throughout. The figures and the following description describe certain embodiments by way of illustration only. In the following description, for purposes of explanation, numerous specific details are set forth in order to provide a thorough understanding thereof. It may be evident however from the following description that the innovation can be practised without these specific details and in alternative embodiments of the structures and methods illustrated herein without departing from the principles described herein. In other instances, well known structures and devices are shown in block diagram form in order to facilitate a description thereof. In addition, where there may be one or more of an illustrated entity, the figures and specification may use a single reference number to refer to both the singular and plural instance of the entity.

The systems and methods described herein relate to generating one or more interactive knowledge lists for enterprises and/or executives based on user request. For clarity and convenience, the systems and methods described herein incorporate by reference U.S. patent application Ser. No. 14/332,253, entitled "Generating a Connection Map for Intelligent Connections in Enterprises," U.S. patent application Ser. No. 14/667,592, entitled "Predictive Intelligent Softbots on the Cloud," U.S. patent application Ser. No. 14/794,656, entitled "Monitoring and Learning the Predictive Business Events' Dynamics Generated by Softbots," and U.S. patent application Ser. No. 14/677,888, entitled "Visualizing, Measuring and Tracking a Sales Process using Network Flow Graphs" in their entirety. However, it should be recognized that this is merely an example, and the systems and methods described herein may be adapted and applied to other predictions and prediction making systems. The following description mentions various entities, categories, predictions, news documents, etc. as examples. It should be recognized that these are merely examples used for clarity and convenience and others exist and are within the scope of this disclosure.

The disclosed systems and methods receive a request from a user (e.g. a typical sales representative) to generate a knowledge list for a preferred enterprise and/or executives within the enterprise, according to one embodiment. The knowledge list aggregates various business events relating to the enterprise or the executive under appropriate business categories (e.g. Leadership change, Acquisitions and Mergers, IP portfolio, etc.) into frames. A typical frame in the knowledge list may include a timeline sequence of the unfolding of a business event associated with a business category with a brief description. The timeline sequence of the unfolding of the business event includes "knowledge" relating to the business event from a point in time when the business event started out as a prediction, changes witnessed during the existence of the business event in terms of anticipations and sentiments in the market to the final convergence of the business event in the real world where the business event has reached a terminating point in business dynamics. The knowledge list is generated by the disclosed systems and methods using real time heuristics including input from various data analytics tools, for example, recommenders, predictive logic, prediction monitoring tools, sales cycle monitoring tools, and the like.

The disclosed systems and methods further identify a minimal set of relevant documents which the user can use to corroborate the brief description of the business event included in the frames of the knowledge list, according to one embodiment. The documents, for example, can be retrieved from different data sources including news sites, blogs, social network, professional network sites, APIs, web documents, application about events, and the like. In one embodiment, the knowledge list is interactive and the user can interact with the knowledge list using natural language queries. The user can utilize the knowledge list functionality described herein to compare two or more knowledge lists of different enterprises and/or executives to visualize and gain a complete understanding of the real world business dynamics and to take a better informed decision about a sales lead in a typical business-to-business (B2B) sales environment.

FIG. 1 illustrates an example computing environment 100 in which a knowledge system 150 generates a knowledge list (can also be referred to as "knowledge script") for enterprises and members of enterprises, according to one embodiment. The computing environment 100 also includes enterprises 110, users 120, data analytics tools 130, and data sources 140, communicatively coupled to the knowledge system 150 by a network 160. Other embodiments may include different and/or additional entities.

The network 160 enables communications among the other entities illustrated in FIG. 1. The network 160 may use standard or custom communications technologies and/or protocols and, in one embodiment, includes the Internet.

The enterprises 110 represent one or more target communities of interest to users of the knowledge system 150. Generally, an enterprise 110 is a business, educational, or governmental organization. For example, an enterprise 110 may be a private or public company, a university, or a government agency. An enterprise 110 may also be a professional group, a social group, a personal group, a friends group and the like.

An enterprise 110 includes one or more members. The members are people that act on behalf the enterprise 110. For example, the members may include employees, owners, and advisors of a business. Different members may have different roles within the enterprise 110. Some members of an enterprise 110 may be responsible for making strategic decisions while other members may be responsible for making purchasing decisions. Some members may have multiple roles within an enterprise 110, and some members may be associated with multiple enterprises.

The enterprises 110 may operate one or more computers that are connected to the network 160. These computers may provide information about the enterprises 110. For example, an enterprise 110 may operate a web site that provides information about the activities of the enterprise 110, the members of the enterprise 110, and the like. In addition, the computers operated by the enterprises 110 provide a facility for electronic communication with the members of the enterprises 110.

The users 120 are people who use the knowledge system 150 to get a knowledgeable information about enterprises 110 and members of enterprises 110. As one example, a user 120 may be a salesperson who uses the knowledge system 150 to generate a knowledge list of an enterprise 110. A knowledge list aggregates, in a chronological order, influential business events associated with the enterprise 110 and/or executives of the enterprise 110 under multiple business categories in a timeline. The knowledge list catalogues the business events as knowledge frames under the respective business categories and the knowledge frames include a brief description of the unfolding of the business event chronologically in the form of text messages. In one embodiment, the text messages can be relevant to the business event and summarize the unfolding of the business event. The knowledge list includes a minimal and relevant sequence of original documents that supplement the text messages of the business events in respective knowledge frames for the purposes of user corroboration. The users 120 use one or more computers to interact with the knowledge system 150.

The data sources 140 may provide information about the entities in the computing environment 110. For example, the data sources 140 provide information about enterprises 110 and members of the enterprises 110, as well as information about other topics. There may be a variety of different data sources 140 providing a variety of different types of information. For example, a data source may be a news site, website, blog, social network site, professional network site and the like. A news data source 140 may provide news information describing current events involving the enterprises 110 and members. A business information data source 140 may provide information about specific enterprises 110. For example, a business information data source 140 may include a database that describes attributes of members of a specific enterprise 110, such as the members' titles and roles within the enterprise 110, and the members' employment and educational histories.

In one embodiment, the data sources 140 may include public data sources such as web sites, blogs, microblogs, and other heterogeneous sources that can be user-generated and publicly-accessible on the network 160. For example, a microblog may provide a plurality of information snippets including business sentiments, product endorsements and popularity of enterprises and executives. In addition, the data sources 140 may include private content sources such as databases that are available via paid access. The data sources 140 likewise may include content that is published by the enterprises 110 and content published by other people or organizations.

The data analytics tools 130 may process content generated by the data sources 140 and send the output of such data analytics to the knowledge system 150, according to one embodiment. In one embodiment, the data analytics tools 130 may be Software as a Service (SaaS) based data analytics tools 130. For example, there may be a variety of different SaaS based data analytics tools 130 including, but not limited to, a recommender, a predictive logic tool, a prediction monitoring tool, a network flow analytics tool and the like. Depending upon the embodiment, there may be one or more data analytics tools 130 in the computing environment 100. To support the different data analytics tools 130, the knowledge system 150 uses a knowledge grammar rule to incorporate various data analytics and generate coherent information in the form of a knowledge list.

A recommender may generate recommendations using different data sources 140 including online news, social network, blogs, etc. to send to the knowledge system 150. For example, a recommender may generate recommendations on various attributes of a member belonging to a particular enterprise 110 which informs the user 120 on a way to seek an introduction with the member to initiate a sales call. The introduction with the member may happen through former colleagues, alumni, and peers of the user 120 who work directly or indirectly with the member in the enterprise 110. In one embodiment, the knowledge system 150 may use these recommendations as heuristics to identify which business events of the enterprise 110 are getting favoured by the social groups in the real world. The knowledge system 150 in turn uses the favours as heuristics to track important events, to identify which events are unfinished and what events are trending in the process of generating a knowledge list for the enterprises 110. The recommender sends the original documents or descriptions to the knowledge system 150 as evidence for the recommendations that were generated from the documents. In one embodiment, the recommender can be a separate utility as described in detail in U.S. patent application Ser. No. 14/332,253, entitled "Generating a Connection Map for Intelligent Connections in Enterprises," which is incorporated by reference herein in its entirety.

A predictive logic tool may generate statistically relevant predictions or forecasts about business events in an enterprise 110 and/or executives in the enterprise 110 under a set of predefined business categories. For example, the predefined set of business categories can include, but not limited to, leadership changes, acquisitions, intellectual property, new product offerings, etc. The predictive logic tool aggregates news, rumors, etc. about the enterprise 110 and/or executives under the set of predefined business categories to generate the relevant predictions about business events and/or business activities. In one embodiment, the knowledge system 150 uses these predictions to categorize the knowledge included in the knowledge list about the enterprises 110 into different categories. Thus, the knowledge within the knowledge list will be chronicled as a sequence of messages in a time line under the set of predefined business categories to which the events belong. The predictive logic tool supplies the knowledge system 150 with the original documents that the predictive logic tool used to generate the predictions. In one embodiment, the predictive logic tool can be a separate utility as described in detail in U.S. patent application Ser. No. 14/667,592, entitled "Predictive Intelligent Softbots on the Cloud," which is incorporated by reference herein in its entirety.

A prediction monitoring tool may track the dynamics of a prediction generated by the predictive logic tool until the actualization of the prediction is confirmed in the real world. For example, the prediction monitoring tool measures whether a particular forecasting of a business event as predicted is receiving positive momentum (i.e., strengthening) or negative momentum (i.e., weakening) in the real world until the event predicted is proven correct (i.e., the event occurs in the real world as predicted) or false (i.e., the event does not occur in the real world as predicted). In one embodiment, the prediction monitoring tool generates a reasoning including factors that influenced the prediction to manifest in the real world as per the forecast. In another embodiment, if a certain threshold of time period is crossed and the concerned prediction has not been confirmed as actualized in the real world, the prediction monitoring tool may report on the factors that made the prediction not manifest as per the forecast. In one embodiment, the knowledge system 150 uses the monitoring data generated on the predictions by the prediction monitoring tool as heuristics to identify which events are more probable to generate meaningful knowledge about the enterprise 110 and to identify which events may possibly terminate without an ending. In addition, the knowledge system 150 uses the heuristics to determine a minimal set of relevant documents to support the evidence shared by the knowledge included in the knowledge list. In one embodiment, the prediction monitoring tool can be a separate utility as described in detail in U.S. patent application Ser. No. 14/794,656, entitled "Monitoring and Learning the Predictive Business Events' Dynamics Generated by Softbots," which is incorporated by reference herein in its entirety.

A network flow analytics tool generates predictions relating to a sales cycle of enterprises 110. The network flow analytics tool can occasionally be referred to as a "sales cycle monitoring logic." In one embodiment, the network flow analytics tool determines a total flow of sentiments including "positive flow" (i.e., information which is a positive indicator of a successful sales cycle) and/or "negative flow" (i.e., information which is a negative indicator of a successful sales cycle) relating to the sales cycle of enterprise 110 of interest using network flow logic. For example, the network flow logic may include Max Flow algorithms, Min-Cut logic, BellMan Ford method, Cycle Cancellation method, etc. In one embodiment, the network flow analytics tool identifies a number of past sales cycles with an enterprise 110 that ended up successful. In one embodiment, knowledge system 150 uses the predictions relating to the sales cycle made by the network flow analytics tool to frame the knowledge in the knowledge list about the enterprise 110. For example, the knowledge about past sales cycle history of the enterprise 110 and knowledge including a prediction whether an ongoing sales cycle will be successful with the enterprise 110. In one embodiment, the network flow analytics tool can be a separate utility as described in detail in U.S. patent application Ser. No. 14/677,888, entitled "Visualizing, Measuring and Tracking a Sales Process using Network Flow Graphs," which is incorporated by reference herein in its entirety.

The knowledge system 150 provides a user 120 with information including interactive knowledge lists on enterprises 110, executive members of the enterprises 110, or both based on a request from the user 120. In one embodiment, the knowledge system 150 includes one or more computers that provide a web site or other interface using which the users 120 can interact with the system 150. The users 120 may use the knowledge system 150 to know and learn information about different enterprises 110 and members within the different enterprises 110. For example, a user who is a salesperson can use the knowledge system 150 to identify a sales cycle of the enterprises 110.

When a user 120 uses the knowledge system 150 to gain information about a target such as an enterprise 110 and/or executives within the enterprise 110, the user may specify a request to build a knowledge list for the enterprise 110 and/or executives. In one embodiment, the knowledge system 150 receives a stream of information from the users 120, data sources 140, data analytics tools 130, etc. relating to the enterprise 110 and/or executive members within the enterprises 110. The knowledge system 150 may also receive updates from a customer support system (not shown in FIG. 1) used by the users 120. The updates may inform a change in location of the enterprise 110 and/or a change in contact of the executives. In one embodiment, the knowledge system 150 collates the received information and generates a knowledge list for a requested enterprise 110 by categorizing the information under different business categories. For example, the knowledge system 150 generates a knowledge list that includes a frame for a business event and/or business activity of a particular business category. The frame maintains a stream of grammar text (i.e., brief description) in chronological sequence that includes a relevant description of the unfolding of the business event from a beginning of the event through a time of the event's existence and to a final convergence of the event in the real world if a final convergence has occurred.

In addition, the knowledge system 150 associates with the frame a minimal set of original documents. The minimal set of original documents are not repetitive (or have a minimal amount of repetition) and in essence include valuable insights about the business event. The minimal set of original documents can be used for corroboration of the stream of grammar text included in the frame about the business event. For example, the knowledge system 150 fetches the business events from various documents and identifies a minimal set of original documents that consistently support and corroborate the description in the frame. The knowledge system 150 displays the knowledge list generated for the enterprise 110 to the user 120. The user may interact with the displayed knowledge list. In one embodiment, the knowledge system 150 provides the user 120 with a side by side comparison of two or more knowledge lists. For example, the user 120 may be a sales representative who uses the comparison of two or more knowledge lists of different enterprises to make a better informed decision about a sales lead in a typical business to business sales environment.

Figure 2:
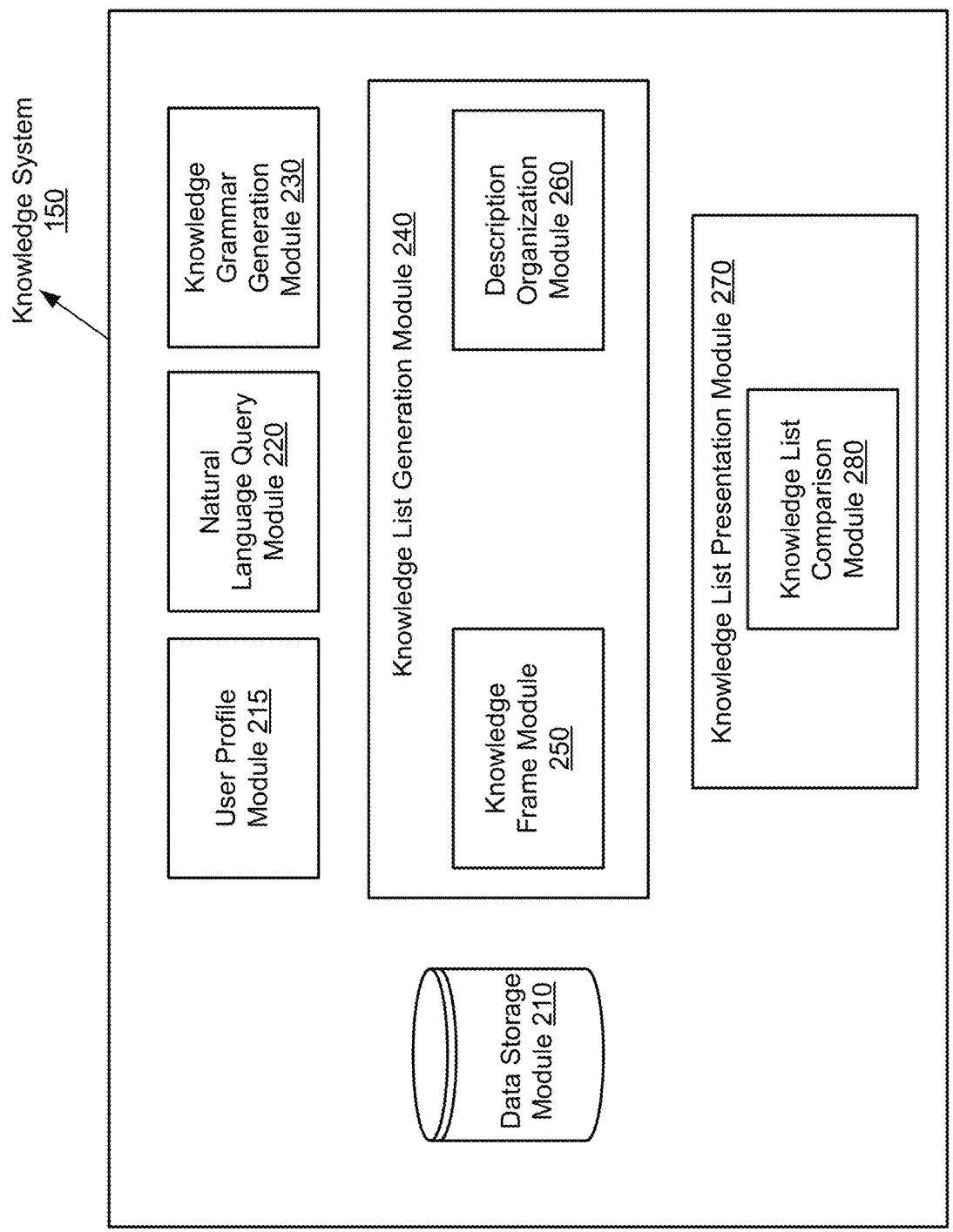
FIG. 2 is an example block diagram illustrating a more detailed view of the knowledge system of FIG. 1 and interactions therewith, according to one embodiment.

FIG. 2 is an example block diagram illustrating a more detailed view of the knowledge system 150 according to one embodiment. In the embodiment show, the knowledge system 150 includes a variety of different modules. Those of skill in the art will recognize that other embodiments of the knowledge system 150 can have different and/or additional modules other than the ones described here, and that the functions may be distributed among the modules in a different manner.

A data storage module 210 receives and stores data collected, generated, and used by the knowledge system 150. The data includes data collected from the data sources 140, the users 120 of the knowledge system 150, and the data analytics tools 130, and data generated by the system 150 during processing of other data and interactions with the users 120. The data storage module 210 may store additional and/or other data in various embodiments.

A user profile module 215 establishes profiles of users 120 with the knowledge system 150. In one embodiment, the user profile module 215 provides graphical user interfaces (GUIs) to users 120 allowing the users 120 to establish accounts at the knowledge system 150. As part of this process, the users 120 provide profile information describing themselves. A user's profile may identify, for example, the user's name, academic information, career information, personal information, social information, present co-worker information, past co-worker information, reference people information, alumni information and the like. In one embodiment, the profile of a user 120 also contains links to the user's accounts on one or more of the social networks (not shown in FIG. 1). For example, the user 120 may provide the user's login credentials for the social networks to the user profile module 215 when establishing the user's account. The user profile module 215 may then use these credentials to access the user's accounts at the social networks and retrieve information about the user and the user's social connections. The user profile module 215 stores the retrieved information within the user's profile.

A natural language query module 220 receives a request from a user 120 to generate a knowledge list for an enterprise 110 and/or executives within the enterprise 110. In one embodiment, the natural language query module 220 generates and provides graphical user interfaces (GUIs) to users 120 allowing the users 120 to send a request to the knowledge system 150. The natural language query module 220 processes the request and sends the processed request to the corresponding modules in the knowledge system 150 responsible for knowledge list generation.

The natural language query module 220 receives a query from a user 120 in natural language text of limited length directed at querying the one or more knowledge lists generated by the knowledge system 150. For example, a natural language query can be "Is enterprise X acquiring enterprise Y?" The natural language query module 220 parses the natural language text and extracts the relevant grammar from the natural language text in the form of business ontologies. For example, the business ontologies can be one or more from a group of enterprises, executives, products, revenue, technology, shares, categories and subcategories. The natural language query module 220 evaluates whether the parsed grammar text is a positive sentiment or negative sentiment for the extracted categories and subcategories. The natural language query module 220 sends the processed query to the knowledge list presentation module 270 in the knowledge system 150. In one embodiment, the natural language query module 220 prepares a training set of natural language queries. The natural language query module 220 statistically learns the natural language query and its relation to various business categories and ontologies using the training set of natural language queries.

Users 120 may be interested in gaining knowledge about enterprises 110 in a business category that is not included in the predefined set of business categories. In one embodiment, the natural language query module 220 receives a description from the user 120 for a new business category that is outside of the predefined set of business categories. The natural language query module 220 sends the description to the knowledge grammar generation module 230 for determining influential categories for the new business category and to perform latent semantic indexing on the particular business category.

A knowledge grammar generation module 230 continuously receives, as input, the data analytics associated with an enterprise 110 and executives within the enterprise 110 from one or more data analytics tools 130 of FIG. 1. In one embodiment, the knowledge grammar generation module 230 processes the data analytics from the one or more data analytics tools 130 to extract grammar text messages about business events that is subsequently used by the knowledge list generation module 240 for generating one or more knowledge lists.

The knowledge grammar generation module 230 matches the received input to the requested enterprise or executive using a logic for document-enterprises pairing and document-executives pairing. For example, the knowledge grammar generation module 230 uses various heuristics and look ups to confirm the matching of the received input with the right enterprise and/or executives for whom the knowledge list is being requested to be generated. In one embodiment, the knowledge grammar generation module 230 classifies the received input into one or more of the 18 predefined business categories as shown in example Table 1 below. In one embodiment, the predefined categories are dynamic and extendable by the user 120.

Table 1, below, is an example table listing the categories under the first column which the knowledge grammar generation module 230 uses to categorize the received input about enterprises 110 to build knowledge. The second column tracks and stores the other categories that influence a particular category under the left column. The influential categories can be defined as the set of categories interinfluencing each other contextually in the real world business dynamics (i.e., influencing reciprocally or mutually). In Table 1, a numeral in the second column (i.e., influential categories column) refers to the category number (e.g. numeral 1 refers to Leadership Changes, numeral 2 refers to New Offerings, etc.).

TABLE 1

Influential Category Table

| | Categories: | Influential Categories: |
|---|---|---|
| 1 | Leadership Changes | 3,4,5,10,18,14,15 |
| 2 | New Offerings | 4,7,9,11,12,13 |
| 3 | Acquisitions | 1,4,5,7,8,10,11,15,18 |
| 4 | Partnerships | 1,2,3,5,10,11,14,18 |
| 5 | Expanding Operations | 1,3,4,7,9,14,16,17 |
| 6 | Cost Cutting | 8,9,10,11,14,15 |
| 7 | Outperforming | 5,14,2 |
| 8 | Underperforming | 6,10,15 |
| 9 | Company Presentation | 2,4,5 |
| 10 | Litigation | 11,13,16 |
| 11 | Compliance | 10,3,6 |

TABLE 1-continued

Influential Category Table

| | Categories: | Influential Categories: |
|---|---|---|
| 12 | Research & Development | 2,7,14 |
| 13 | Data Security | 12,14,5 |
| 14 | Funding Developments | 7,3,9 |
| 15 | Bankruptcy & Restructuring | 6,3,8 |
| 16 | Real Estate: Deals | 17,10,5 |
| 17 | Real Estate: Construction | 16,110,5 |
| 18 | Corporate Challenges | 9,1,11 |

For example, the categories influencing the Acquisition category listed in Table 1 may include Leadership Change, Partnerships, Expanding Operations, Outperforming, Underperforming, Litigation, Compliance, Bankruptcy & Restructuring and Corporate Challenges. Similarly, each one of the other business categories listed in Table 1 have their own set of influencing categories which are a subset of the total business categories.

The knowledge grammar generation module 230 further categorizes each one of the business categories in Table 1 into subcategories. FIG. 3 is an example table 300 illustrating a category-subcategory matrix. In FIG. 3, the example table 300 includes only four of the 18 categories from Table 1, namely, Acquisition 302, New Offering 304, Partnership 306, and Leadership Change 308 for the sake of clarity. The example table 300 includes a set of subcategories under each one of the four categories in the leftmost column 310.

In one embodiment, the knowledge grammar generation module 230 classifies the received input into categories and subcategories using latent semantic indexing. The knowledge grammar generation module 230 uses a training set that includes Terms (subcategories)-Documents (categories) for each one of categories in Table 1 and the subcategories belonging to them (as shown in leftmost column 310 in FIG. 3). The knowledge grammar generation module 230 derives a matrix (shown in FIG. 3) from the training set. The knowledge grammar generation module 230 decomposes the matrix using Singular Value Decomposition (SVD) to generate training co-ordinates between the "Terms" of subcategories and the "Documents" of the categories. As part of processing the received input from one or more data analytics tools 130, the knowledge grammar generation module 230 determines new co-ordinates for the input using the "Terms" of subcategories. The knowledge grammar generation module 230 compares the new co-ordinates of the input with the training co-ordinates to determine the categories and subcategories for the input. In one embodiment, the knowledge grammar generation module 230 performs latent semantic indexing for each one of the set of influential categories shown in Table 1 as each input can exclusively belong to one influential category set.

In one embodiment, the knowledge grammar generation module 230 uses Artificial Intelligent framework to determine whether a received piece of data about an enterprise 110 or the executive is eligible to become knowledge. For example, the knowledge grammar generation module 230 can determine whether a piece of data is misleading or just a pointer or reference from the pool of big volume of data received by the knowledge system 150 daily or even on an hourly basis in a given time stream.

In one embodiment, the knowledge grammar generation module 230 parses the input classified into categories and subcategories and extracts the grammar text. For example, the grammar text can be extracted in the form of the following string:

--- [Date=date of the input/document OR '?']
--- [Type=recommendation/prediction/monitored prediction/network flow analytics/other OR '?']
--- [Source=data sources {(online news-vendor), (social media-Twitter/Facebook/LinkedIn) . . . OR '?']
--- [Ontologies=enterprises (public or private)/executives (present role, future role, past role)]
--- [Category=Leadership Change (Sub Category=)/Acquisition (Sub Category=)/IP (Sub Category=)/Corporate Challenges (Sub Category=) . . . remaining 18 categories OR '?'].

In the above string, '?' represents absence of information. In one embodiment, the knowledge grammar generation module 230 determines whether the derived grammar text is devoid of information in essential fields, for example, ontologies, categories, date, and the like. The knowledge grammar generation module 230 delays sending the grammar text to the knowledge list generation module 240 until the missing information or other ambiguities are resolved. For example, the knowledge grammar generation module 230 waits for further data analytics input from the one or more data analytics tools 130. When there is no missing information in the grammar text, the knowledge grammar generation module 230 sends the grammar text to the knowledge list generation module 240.

FIG. 4 is an example graphical representation 400 of a piece of news document from a news data source. An example process of the knowledge grammar generation module 230 extracting a grammar text is described below. The knowledge grammar generation module 230 receives the news document 402 and identifies that the ontologies mentioned in the news document 402 are enterprises "Motorola Mobility," "Lenovo," and "Google" using enterprise-document pairing. Similarly, the knowledge grammar generation module 230 identifies that the executives mentioned in the news document 402 are Lenovo's CEO, "Yang Yuanqing" and President of Motorola Mobility, "Rick Osterloh" using executives-document pairing. The knowledge grammar generation module 230 extracts relevant terms other than the ontologies, derives co-ordinates using SVD of the influential categories and classifies the piece of news document 402 into categories-subcategories: Acquisition, {sub category=Acquire (bought and acquired appearing in text) and Acquiring child (fully owned subsidiary)}+IP (patent portfolio appearing in text). For example, the knowledge grammar generation module 230 generates the following grammar text for "Acquisition" knowledge frame from the piece of news document 402 in FIG. 4:

Date=30 Oct, 2014 16:07.
Type=Smart News Agent.
Source=Reuters.
Business Ontologies=Enterprises {Google (Public)+Lenovo (Public)+Motorola Mobility (child Google)}+Executives=Yang Yuanqing (Role=CEO)+Rick Osterloh (Role=President).
Categories: Acquisition {sub category=Acquire and Acquiring child+IP(patent portfolio)}

Figure 5:
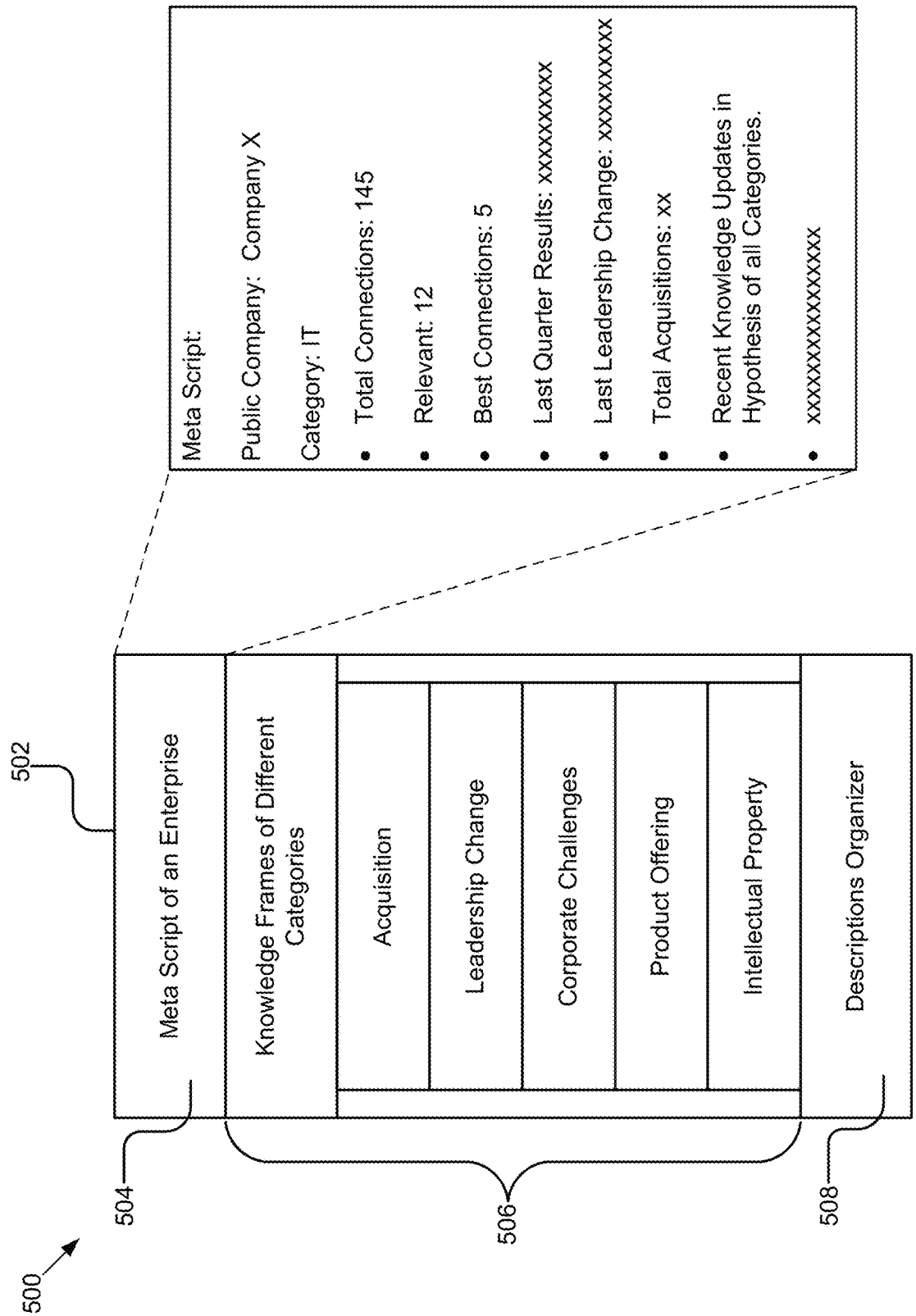
FIG. 5 is an example graphical representation illustrating the functionality of a knowledge list for an enterprise, according to one embodiment.

The knowledge list generation module 240 receives the grammar texts extracted by the knowledge grammar generation module 230 describing business events relating to a requested enterprise or executive under different business categories and the set of documents from where the business events were extracted as the grammar texts. The knowledge list generation module 240 generates a knowledge list about a requested enterprise or executive by combining the grammar texts and the minimal set of document needed as shown in FIG. 5. FIG. 5 is an example graphical representation 500 illustrating the functionality of a knowledge list for an enterprise according to one embodiment. In the graphical representation 500, the knowledge list 502 includes three main components: the meta script 504, the knowledge frames 506, and the descriptions organizer 508. The meta script 504 includes unchanging facts and patterns of the enterprise for a period of time, for example, a month, a quarter, etc. The meta script 504 provides a quick summary for the user to get a static first impression of an enterprise. The meta script 504 does not change unless some major event, for example, a change in leadership happens within the organization of the enterprise or an acquisition of a new company by the enterprise is confirmed. The meta script 504 includes connection information between the user and the executives of the enterprise to illustrate a way to connect with the executives. For example, the meta script 504 describes best connections available to the user to establish contact with the executives of the preferred enterprise. The knowledge frames 506 is a collection of frames under different business categories. Each frame includes a timeline sequence of relevant information in the form of grammar text messages describing the unfolding of a business event associated with the enterprise and/or executive under a business category. For example, the knowledge frames 506 includes a frame for "Acquisition" category, "Leadership Change" category, "Corporate Challenges" category, "Product Offering" category, and "Intellectual Property" category. The descriptions organizer 508 includes a minimal set of relevant documents in the form of news, blogs, microblogs, and other documents that corroborates the description in the knowledge frames 506 under different categories.

In one embodiment, the knowledge list generation module 240 includes a knowledge frame module 250 and a description organization module 260.

In one embodiment, the knowledge frame module 250 continuously receives the grammar text extracted by the knowledge grammar generation module 230 describing one or more business events relating to a requested enterprise or executive under different business categories. The knowledge frame module 250 populates the grammar text messages belonging to a particular business category into the corresponding frame of the knowledge list in a chronological sequence such that the frame provides a timeline of the unfolding of the business event or activity. For example, a knowledge frame for category "Acquisition" in the knowledge list may include grammar text messages in a chronological sequence as shown below:

Date: Feb. 1, 2014. Prediction: Google may acquire Motorola Mobility-Source (Reuters)
    Date: . . . News: Google interested in IP of Motorola
        Recommender: Positive Sentiment on Acquisition-Source (Twitter)
    Date: . . . News: Negotiation between Google and Motorola Settled.
    Prediction Monitor: Acquisition of Motorola has high likelihood.
    Date: . . . Confirmed: News: Google acquire Motorola.

Figure 6:
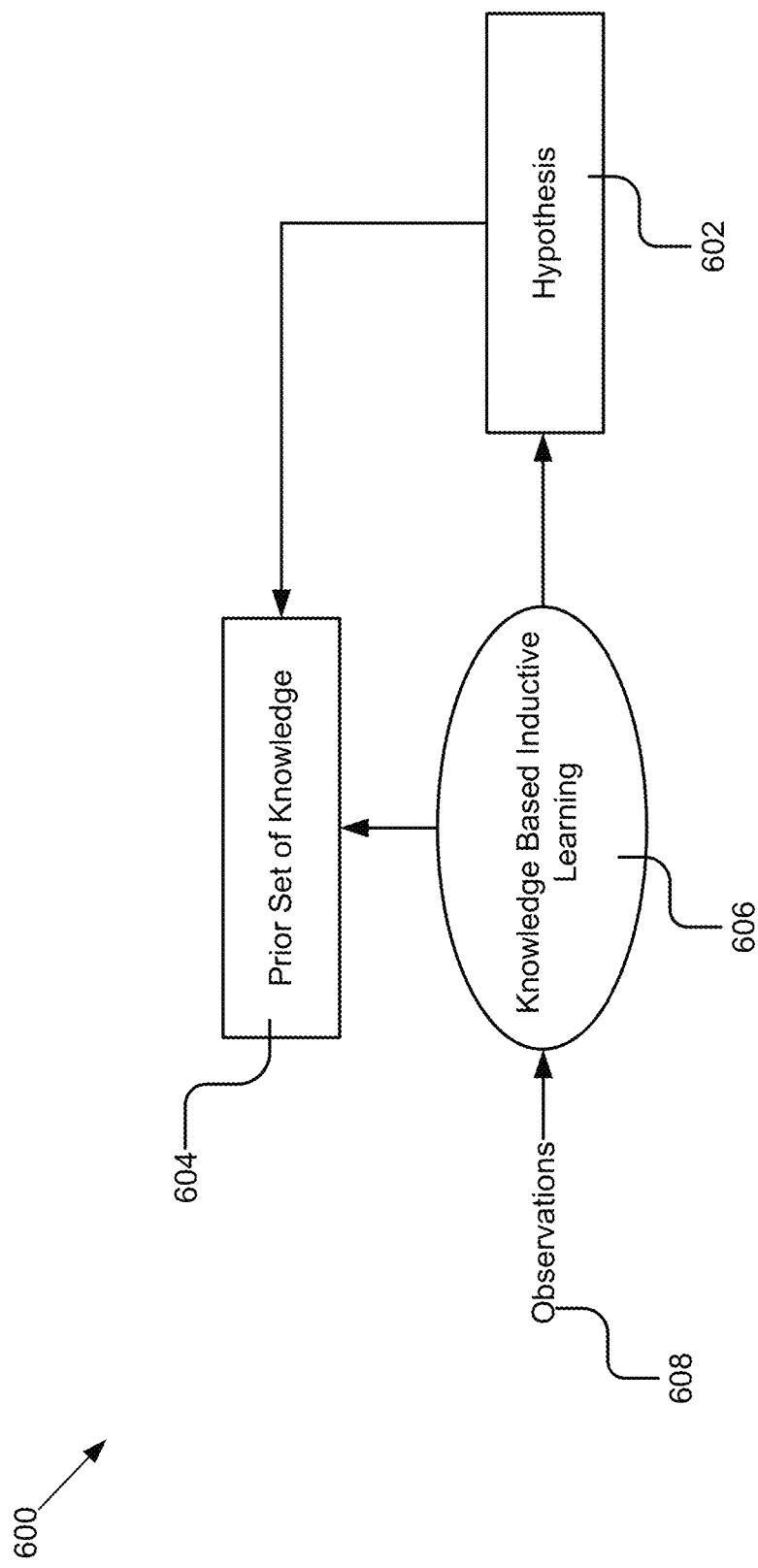
FIG. 6 is an example graphical representation of a knowledge model, according to one embodiment.

In one embodiment, the knowledge frame module 250 determines a sentiment (i.e., positive or negative) in the grammar text message of a category and maintains independent frames for positive and negative sentiments of the same category. In one embodiment, the knowledge frame module 250 determines a probable hypothesis for the set of grammar text messages received for a business event of a particular category in relation to a knowledge frame of the knowledge list. In one embodiment, the knowledge frame module 250 uses a knowledge model as shown in FIG. 6 for determining the hypothesis for the set of grammar text messages. FIG. 6 is an example graphical representation 600 of a knowledge model. The graphical representation 600 illustrates the hypothesis 602 intersecting with the prior set of knowledge 604 to create knowledge based inductive learning 606. The prior set of knowledge may occasionally be referred to herein as "prior knowledge," a "set of prior knowledge," or similar. The hypothesis 602 is variable and fluctuates as a result of the observations 608 being processed by the knowledge model into one or more knowledge frames. The hypothesis 602 includes the latest hypothesis generated for a same category and for a same business ontology based on intersecting the prior set of knowledge 604, the one or more knowledge frames and a last or a previous hypothesis. The prior set of knowledge 604 represents a crystallization or stabilization of the hypothesis 602 that happens over a period of time.

The prior set of knowledge 604 in FIG. 6 can also referred to as a conceptual dependency (or a set of conceptual dependencies) between business categories, between sub-categories, and between ontologies for various business categories. The latest hypothesis can represent a new set of conceptual dependency. In one embodiment, the knowledge frame module 250 prepares a training set of documents to learn the conceptual dependency. The knowledge frame module 250 uses a standard machine learning model on the training set and formulates the conceptual dependency as a classification problem to be solved. As an example, consider the following event in the business category of "Acquisition." Suppose an enterprise 'X' is deciding to acquire another enterprise 'Y,' there can be three main factors that are influencing the decision: a) whether corporate challenges of 'X' can be resolved by the acquisition if the intellectual property of 'Y' can stabilize 'X' in the market as a result, b) if 'X' is in need of the talent force of 'Y,' and c) the product offered by 'Y' is in line or extension of the product offered by 'X.' To learn the conceptual dependency of "Acquisition" on "Leadership," "Product," and "IP," the knowledge frame module 250 receives the set of documents and other descriptions on the "Acquisition" category, extracts the relevant knowledge grammar text messages and learns the conceptual dependency structure out of the documents and descriptions. In one embodiment, the knowledge frame module 250 uses a machine learning model, for example, a log linear model on the classification problem of determining the conceptual dependency between the categories based on the positioning of the grammar text messages and connecting verbs in the documents. The knowledge frame module 250 learns the conceptual dependency between "Acquisition" and the influencing categories for the example above as follows:

Acquire=Posses/Extend/Synonyms (IP+Leaders+New Product)
    IP=Between (negotiated, Leaders)
    New Product=Extension (Existing Product).

Figure 7:
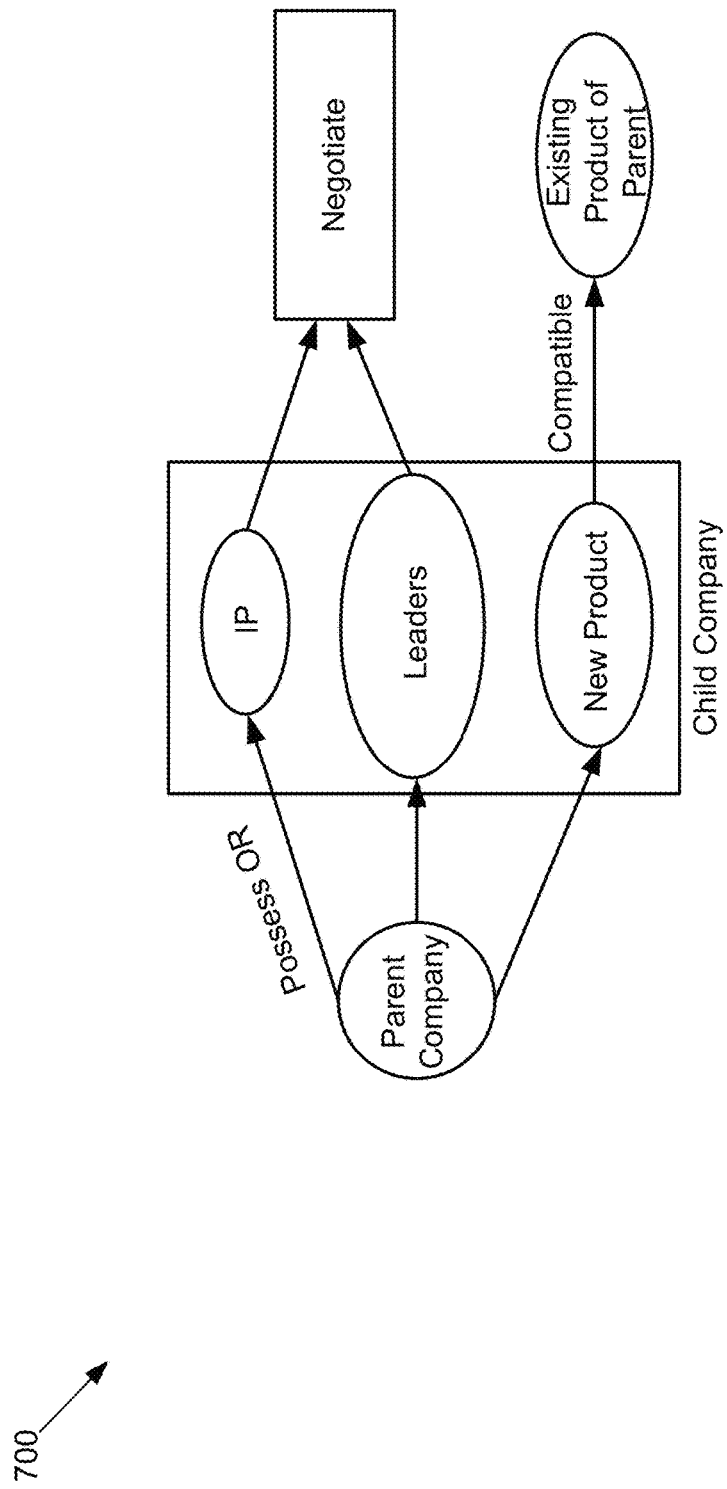
FIG. 7 is an example graphical representation of the conceptual dependency between categories, according to one embodiment.

The knowledge frame module 250 models the above conceptual dependency or the prior set of knowledge 604 in FIG. 6 as a graph data structure (conceptual graph, Retrieve Form for Data Capture (RFD) database or a semantic net) shown in FIG. 7. FIG. 7 is an example graphical representation 700 of the conceptual dependency between "Acquisition" and the influencing categories in the above mentioned example event in the business category of "Acquisition."

In one embodiment, the knowledge frame module 250 utilizes the following algorithm to determine the overall hypothesis 602 in FIG. 6:

Function: Influential Determinants (Grammar Text Messages-M, Prior Knowledge, Bias Hypothesis-A)
        For Message M−1 to N of Category C, do
            For each subset Ai of Bias Hypothesis
            If Consistent-Det (Ai, M)=True, then return Ai
            Else Q=Intersect (Questions Q, Message M, Descriptions D)
        Update the Prior Set of Knowledge and New Hypothesis=Q;
    Function Consistent-Det (Ai, M, Descriptions D) returns a truth value
        Local variables: Hash Table containing set of Descriptions D
            For each Message M and the corresponding Description D do
                If some Description in H has a Mismatch with the Ai
                Then return false
            Else return True.
    Function Intersect (Q, M, Descriptions D) returns new updated Q
        Local variables: Hash Table containing set of Descriptions D
            For each Message M do
                If some Description D in H has a Category-Sub Category intersection, with the Ai /*Intersection includes Frame Communications between categories and Knowledge Lists */
                Then return Q=Category-Subcategory Intersection.
        Else return Nil.

An example process of the knowledge frame module 250 utilizing the above algorithm is described below. As mentioned in the detailed description earlier, the knowledge frame module 250 continuously receives extracted grammar text from the knowledge grammar generation module 230 for one or more business events of an enterprise under different business categories. Assume the knowledge frame module 250 is receiving a following example segment of grammar text (i.e., observations 608 in FIG. 6) and accompanying description in italics:

Date: Feb. 1, 2014. Prediction: Google may acquire Deep Mind-Source (Reuters)
        Date: . . . News: Google interested Deep Learning
            Date: . . . Recommender: Positive Sentiment on Acquisition by Larry Page-Source (Twitter)
        Date: . . . News: Negotiation between Google and Deep Mind Settled.
        Prediction Monitor: Acquisition of Deep Mind has high likelihood.
    Date: Recommender: Positive Sentiment by Ray Kurzweil for Demis Hassabis.

Google's hiring of DeepMind will help it compete against other major tech companies as they all try to gain business advantages by focusing on deep learning. For example, Facebook recently hired NYU Professor Yann LeCunn to lead its new artificial intelligence lab, IBM's Watson supercomputer is now working on deep learning, and Yahoo recently acquired photo analysis startup LookFlow to lead its new deep learning group.

The knowledge frame module 250 processes the above segment of grammar to build a knowledge frame on category "Acquisition." The knowledge frame module 250 retrieves prior knowledge for the knowledge frame on category "Acquisition" from the graph data structure shown in FIG. 7. The knowledge frame module 250 determines a bias hypothesis about the category "Acquisition." For example, in one embodiment, the knowledge frame module 250 accesses a past history of hypotheses regarding Google Acquisitions with child companies as the business ontology. Also assume that Google's last acquisition was Motorola Mobility, and the knowledge frame module 250 retrieves the last hypothesis as IP=Negotiated (Parent Company, Child Company) AND New Product=Extension (Existing Product). The knowledge frame module 250 formulates a guess that the segment of grammar and the set of documents associated with the segment of grammar will be biased on "IP" and "New Product." As a result, the knowledge frame module 250 attempts to identify whether Deep Learning from the segment of grammar is a Product or IP.

The knowledge frame module 250 tests the first bias hypothesis of whether Deep Learning is a sub category of IP of the ontology Google as in Category [?=IP], Sub Category [Deep Learning]. The knowledge frame module 250 parses the accompanying description of the segment of grammar to identify a relevance of Deep Learning to Google's IP by way of matching the first bias hypothesis with the description. When there is no relevance, the knowledge frame module 250 tests the second bias hypothesis of whether Deep Learning is a sub category of Product as in Category [?=Product], Sub Category [Deep Learning]. The knowledge frame module 250 intersects the second bias hypothesis with the ontology Yahoo frame of acquisition of Look Flow by searching the description. From the Yahoo's frame of acquisition of Look Flow, the knowledge frame module 250 identifies the knowledge in the form hypothesis as Builds [Deep Learning, Product]. The knowledge frame module 250 adds Deep Learning as one of the sub category of category Product for the ontology Google in the knowledge frame.

Figure 8:
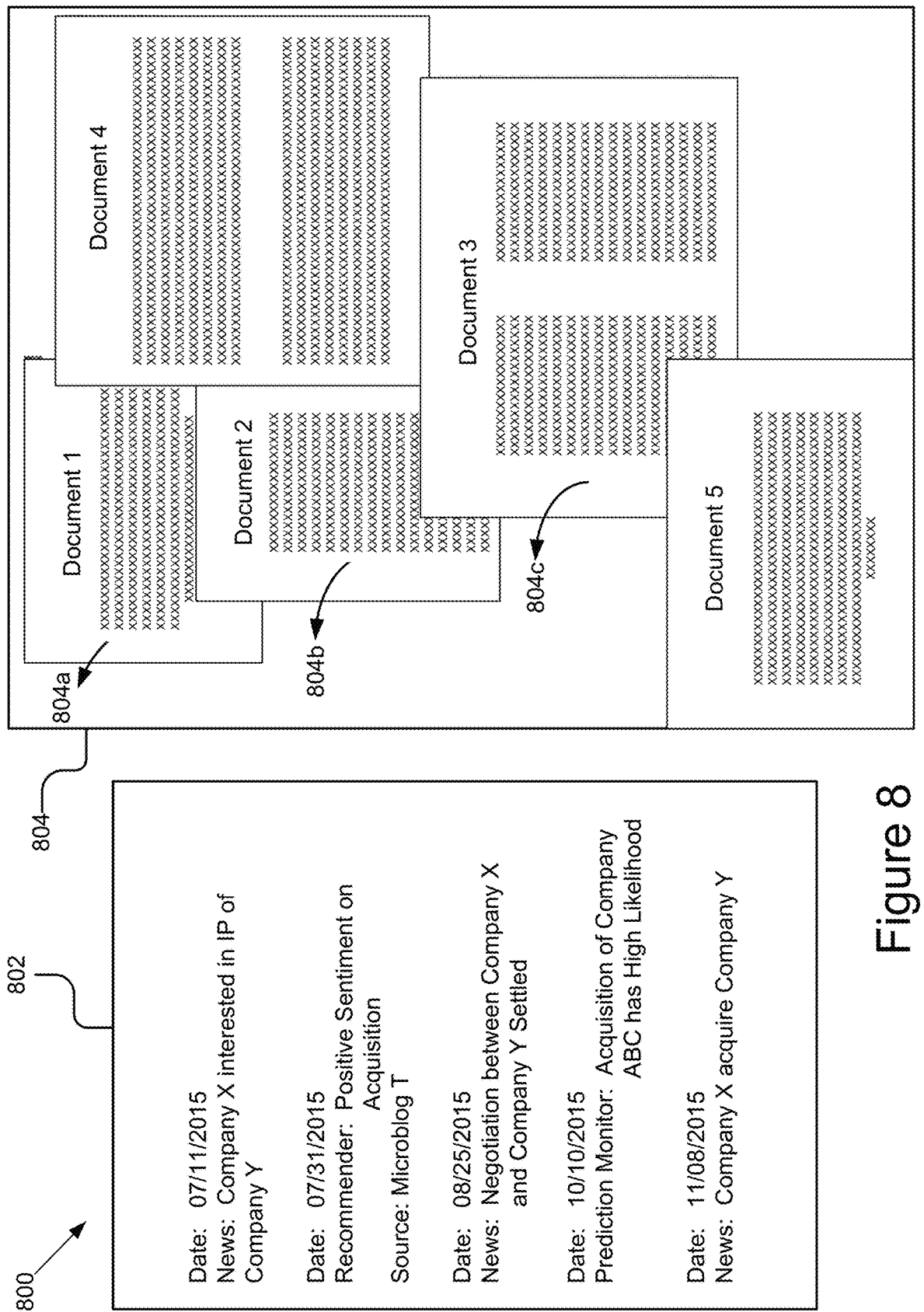
FIG. 8 is an example graphical representation illustrating the functionality of the descriptions organizer component in the knowledge list, according to one embodiment.\

The description organization module 260 collates a minimal set of original documents or descriptions that can corroborate the grammar text included in the knowledge frame for a particular business category. The description organization module 260 collates the documents from the data sources 140 including news site, blogs, social networks, microblogs, etc. The description organization module 260 associates the minimal set of original documents with a corresponding knowledge frame in the descriptions organizer 508 of the knowledge list 502 shown in FIG. 5. This is because users 120 may wish to review documents related to the information shared by the knowledge frame of a business category related to the enterprise. Most of the information in the documents might be repetitive and redundant and it is advantageous to associate a minimal set of original documents that consistently justifies the description included in the knowledge frame for the users 120. The functionality of the description organizer 508 in FIG. 5 is illustrated in detail in FIG. 8. FIG. 8 is an example graphical representation 800 illustrating the functionality of the description organizer component in the knowledge list. The graphical representation 800 includes a knowledge frame 802 of the knowledge list. The knowledge frame 802 includes a stream of grammar text messages for the category of "Acquisition." The stream of grammar text messages relate to the business events of the ontologies, Google and Motorola. The graphical representation 800 includes a collection 804 of multiple documents associated with the category "Acquisition." The description organization module 260 selects documents 804a-804c from the collection 804 as the minimal set of relevant documents. The documents 804a-804c is the most consistent documents that are relevant for the user to review to corroborate the stream of grammar text messages in the knowledge frame 802 for the category of "Acquisition".

In one embodiment, the description organization module 260 utilizes the following algorithm to determine the minimal set of documents 804a-804c in FIG. 8:

Function Minimal_Consistent_Relevant set (Messages M, Global Prior Knowledge K, Global Present Hypothesis H, Descriptions D)
/*return minimal consistent relevant set of Descriptions as Documents
Local variables: Hash Table H containing set of Descriptions D, D'=Nil
For each Message M, retrieve the set of corresponding descriptions D from Hash Table H do
Extract the total Grammar Text messages set M' from each Description D
Compare M' in the order,
If (M'>Prior Knowledge and D'⊂M') then (D'=D), save M' with Prior Knowledge and exit;
If (M'=Prior Knowledge and D'⊄M') then (D'=D'∪D);
If (M'>Present Hypothesis and D'⊄M') then (D'=D'∪D);
If (M'=Present Hypothesis and D'⊄M') then (D'=D'∪D);
If (M'<Present Hypothesis and D'⊄M') then (D'=D'∪D);
Return (D')

The description organization module 260 identifies a grammar text and retrieves a corresponding set of documents for the grammar text. The description organization module 260 determines whether the set of documents includes more information than prior set of knowledge. If so, the description organization module 260 identifies the set of documents as the original documents from where the grammar text was extracted. In the above algorithm, D'⊂M' is indicating that the grammar text messages of the relevant set of documents is getting compared with the total grammar text messages of the set of documents. Once the information in the relevant set of documents goes beyond the prior knowledge, the description organization module 260 utilizes the surplus information to update the prior set of knowledge if the surplus information is consistent with the business category and ontologies of the prior set of knowledge.

The knowledge list presentation module 270 within the knowledge system 150 presents the one or more knowledge lists generated by the knowledge list generation module 240 to users that requested the knowledge lists for their preferred enterprises and/or executives. In one embodiment, the knowledge list presentation module 270 creates a GUI that includes a visual representation of the knowledge list for the user. In addition, the GUI presented by the knowledge list presentation module 270 allows the user to interact with the knowledge list using natural language queries. In one embodiment, the knowledge list presentation module 270 includes a knowledge list comparison module 280.

The knowledge list comparison module 280 receives a query from a user for comparing the individual knowledge lists of two or more enterprises and/or executives. The knowledge list comparison module 280 creates a GUI for presenting the comparison of the individual knowledge list so that the user can evaluate and select a better enterprise for an informed sales decision. For example, a user wishing to sell a product to a start-up company A may come to know that enterprise X is in the process of acquiring start-up company Y. The user requests for a knowledge list of the enterprise X and directs a query "Is the acquisition of start-up company A by enterprise X look promising" to the knowledge list of the enterprise X. The knowledge list comparison module 280 retrieves the knowledge list of the enterprise X and identifies the hypothesis associated with a knowledge frame under acquisition category in the knowledge list. The knowledge list comparison module 280 uses the hypothesis to retrieves the relevant information to present to the user about past sales cycle of the user's enterprise with enterprise X. If the prediction on acquisition of start-up company A is gaining a momentum, the user can query the knowledge lists of companies similar to the start-up company Y, particularly the hypothesis of knowledge frame under the acquisition category of those companies, to understand the real world business dynamics and make an informed decision.

Figure 9:
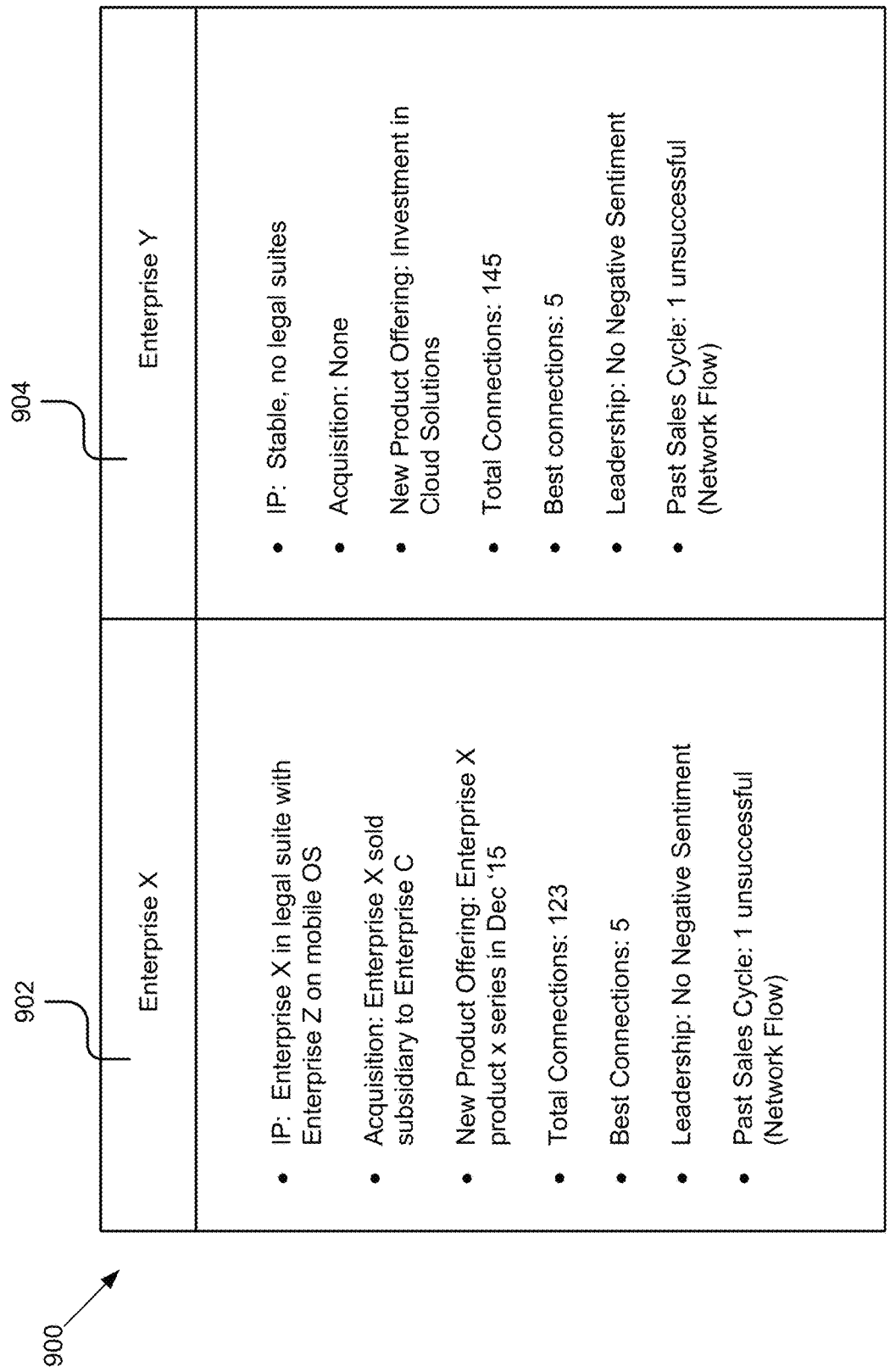
FIG. 9 is an example graphical representation illustrating the functionality of knowledge list comparison, according to one embodiment.

FIG. 9 is an example graphical representation 900 illustrating the functionality of knowledge list comparison. The graphical representation 900 includes a juxtaposition of knowledge lists of the enterprise X 902 and enterprise Y 904. In one embodiment, the knowledge list comparison module 280 retrieves the meta script from the knowledge lists. The meta script from the knowledge lists of enterprise X 902 and enterprise Y 904 provides the user with a quick summary. The user can find out which enterprise the user has the option of better connections to get connected with the executive of that enterprise. The user can also find out which enterprise looks promising for the current sales cycle.

Figure 10:
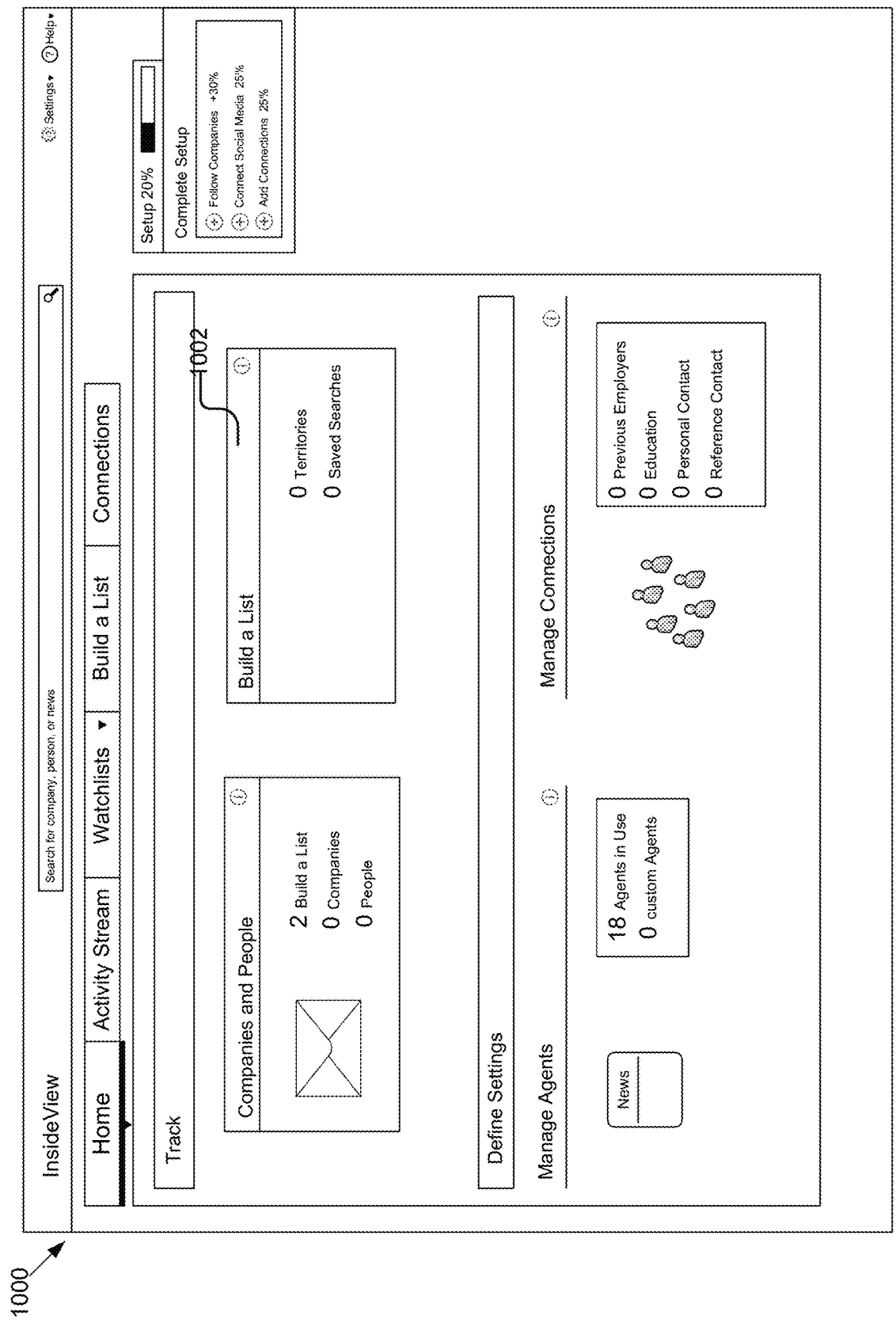
FIG. 10 is an illustration of an example user interface for generating a knowledge list, according to one embodiment.

FIG. 10 is an illustration of an example user interface 1000 for generating a knowledge list according to one embodiment. In the illustrated embodiment, the interface 1000 displays a tab 1002 for generating a knowledge list. The tab 1002, when selected, refreshes the user interface 1000 for the user to input request to generate a knowledge list for a preferred enterprise and/or executives.

Figure 11:
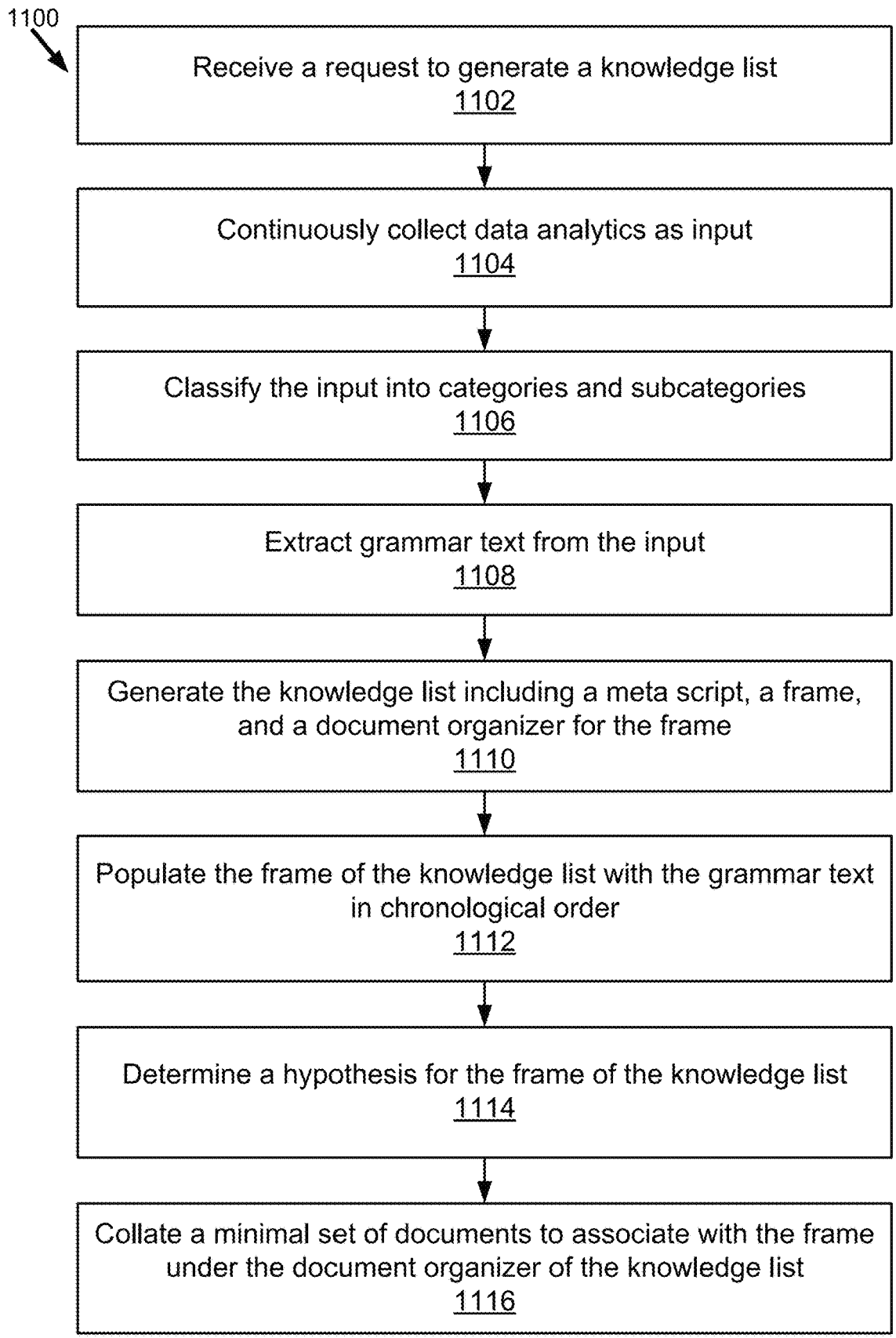
FIG. 11 is an example flowchart of a method for generating a knowledge list by the knowledge system, according to one embodiment.

FIG. 11 is an example flowchart illustrating one embodiment of a method 1100 for generating a knowledge list performed by the knowledge system 150. Embodiments may perform the steps in parallel and/or perform the steps in different orders. Likewise, embodiments may perform different and/or additional steps in other embodiments.

At 1102, the knowledge system 150 receives a request to generate a knowledge list. At 1104, the knowledge system 150 continuously collects data analytics as input. At 1106, the knowledge system 150 classifies the input into categories and subcategories. At 1108, the knowledge system 150 extracts the grammar text from the input. At 1110, the knowledge system 150 generates the knowledge list including a meta script, a frame, and a document organizer for the frame. At 1112, the knowledge system 150 populates the frame of the knowledge list with the grammar text in chronological order. At 1114, the knowledge system 150 determines a hypothesis for the frame of the knowledge list. At 1116, the knowledge system 150 collates a minimal set of documents to associate with the frame under the document organizer of the knowledge list.

Figure 12:
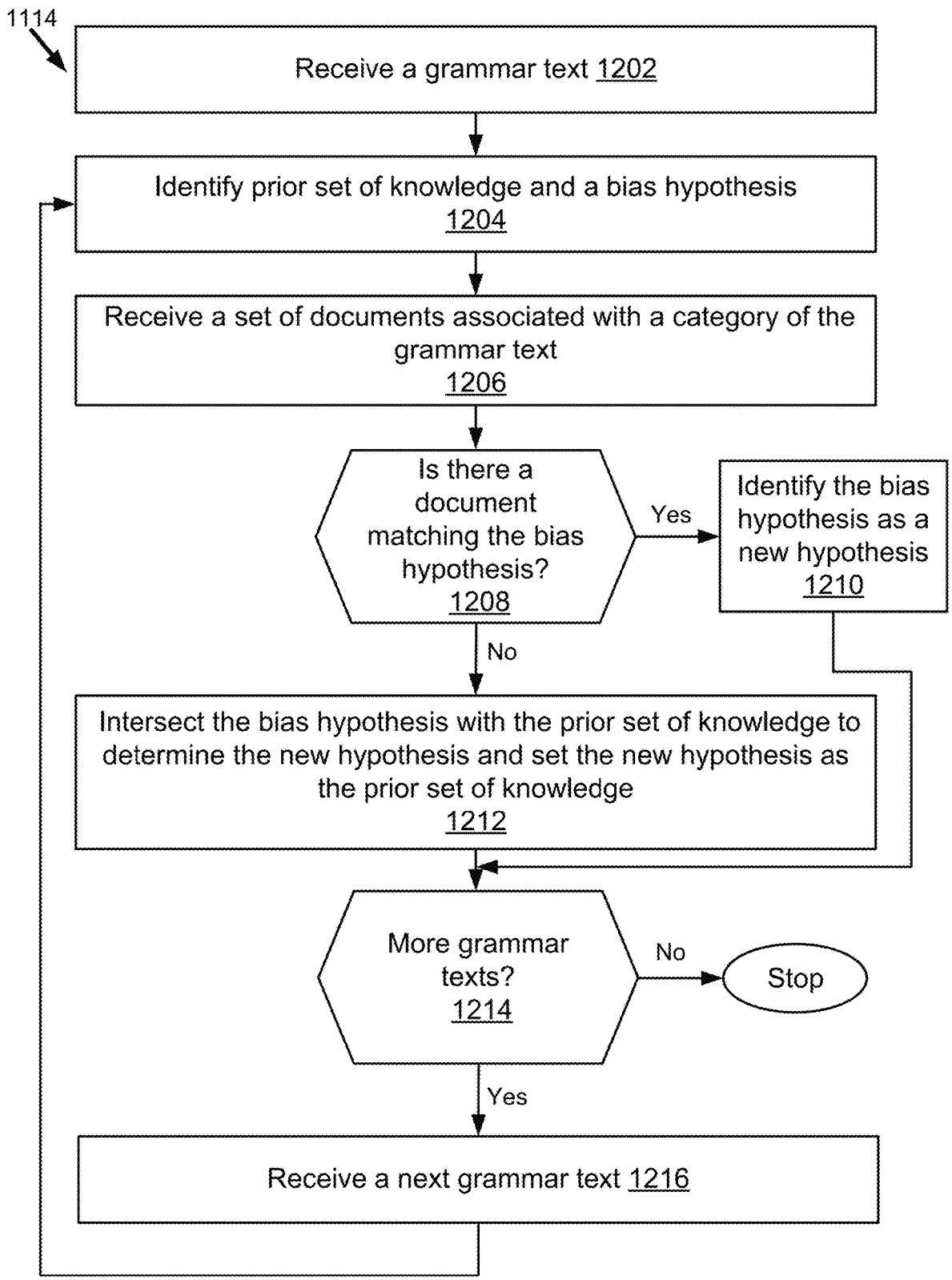
FIG. 12 is an example flowchart of a method for determining a hypothesis for a frame of the knowledge list by the knowledge system, according to one embodiment.

FIG. 12 is an example flowchart illustrating one embodiment of a method 1114 for determining a hypothesis for the frame of the knowledge list. At 1202, the knowledge system 150 receives a grammar text. At 1204, the knowledge system 150 identifies a prior set of knowledge and a bias hypothesis. At 1206, the knowledge system 150 receives a set of documents associated with a category of the grammar text. At 1208, the knowledge system 150 determines whether there is a document matching the bias hypothesis. If the document matches the bias hypothesis, at 1210, the knowledge system 150 identifies the bias hypothesis as a new hypothesis and skips the process to 1214. If the document does not match the bias hypothesis, at 1212, the knowledge system 150 intersects the bias hypothesis with the prior set of knowledge to determine the new hypothesis and set the new hypothesis as the prior set of knowledge. At 1214, the knowledge system 150 determines whether there are more grammar texts. If there are more grammar texts, at 1216, the knowledge system 150 receives a next grammar text and repeats the process at 1204. If there are no more grammar texts, the method 1114 ends.

Figure 13A:
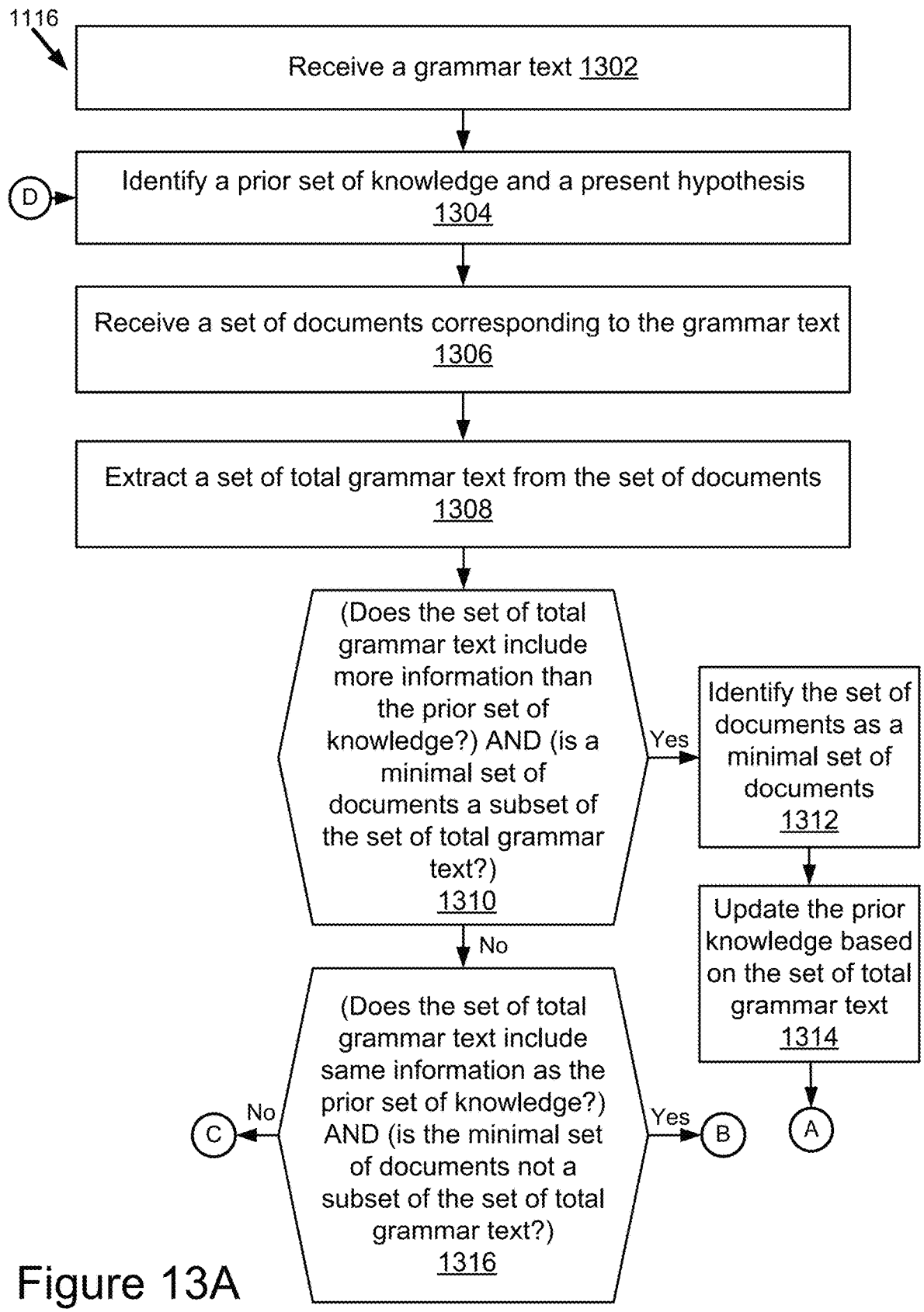
FIGS. 13A-13B are an example flow chart of a method for collating a minimal set of documents to associate with the frame under the document organizer of the knowledge list, according to one embodiment.
Figure 13B:
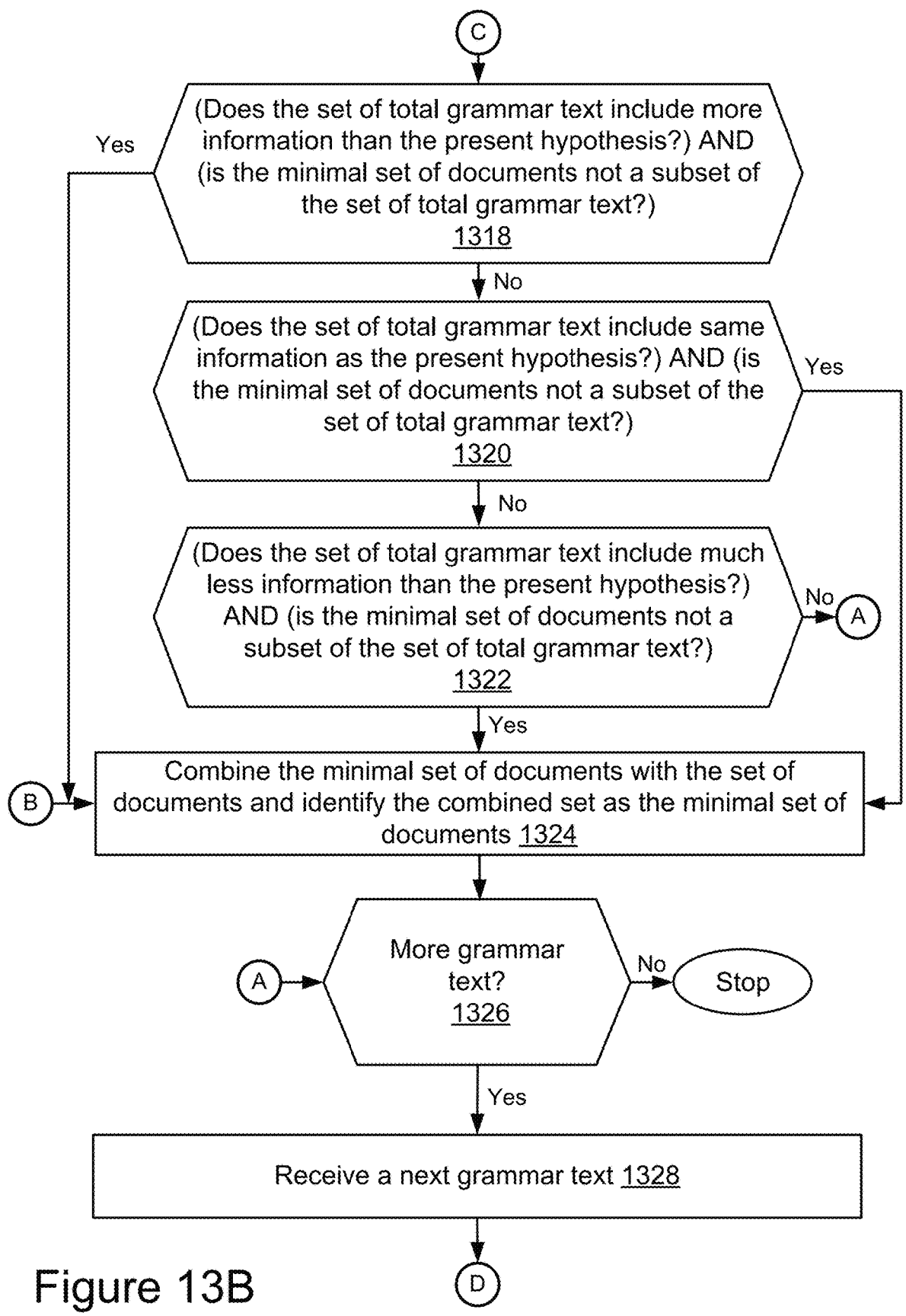

FIGS. 13A-13B are an example flowchart illustrating one embodiment of a method 1116 for collating a minimal set of documents to associate with the frame under the document organizer of the knowledge list. At 1302, the knowledge system 150 receives a grammar text. At 1304, the knowledge system 150 identifies a prior set of knowledge and a present hypothesis for a frame corresponding to the grammar text. At 1306, the knowledge system 150 receives a set of documents corresponding to the grammar text. At 1308, the knowledge system 150 extracts a set of total grammar text from the set of documents. At 1310, the knowledge system 150 determines whether the set of total grammar text includes more information than the prior set of knowledge and whether the set of minimal documents is a subset of the set of total grammar text. If yes, at 1312, the knowledge system 150 identifies the set of documents as the minimal set of documents. At 1314, the knowledge system 150 updates the prior set of knowledge based on the set of total grammar text and skips the process to 1326. If no, at 1316, the knowledge system 150 determines whether the set of total grammar text includes same information as the prior set of knowledge and whether the set of minimal documents is not a subset of the set of total grammar text. If yes, the knowledge system 150 skips the process to 1324. If no, at 1318, the knowledge system 150 determines whether the set of total grammar text includes more information than the present hypothesis and whether the set of minimal documents is not a subset of the set of total grammar text. If yes, the knowledge system 150 skips the process to 1324. If no, at 1320, the knowledge system 150 determines whether the set of total grammar text includes same information as the present hypothesis and whether the set of minimal documents is not a subset of the set of total grammar text. If yes, the knowledge system 150 skips the process to 1324. If no, at 1322, the knowledge system 150 determines whether the set of total grammar text includes much less information than the present hypothesis and whether the set of minimal documents is not a subset of the set of total grammar text. If yes, at 1324, the knowledge system 150 combines the minimal set of documents with the set of documents and identifies the combined set as the minimal set of documents. At 1326, the knowledge system 150 determines whether there are more grammar texts. If there are more grammar texts, at 1328, the knowledge system 150 receives a next grammar text and repeats the process at 1304. If there are no more grammar texts, the method 1116 ends.

Figure 14:
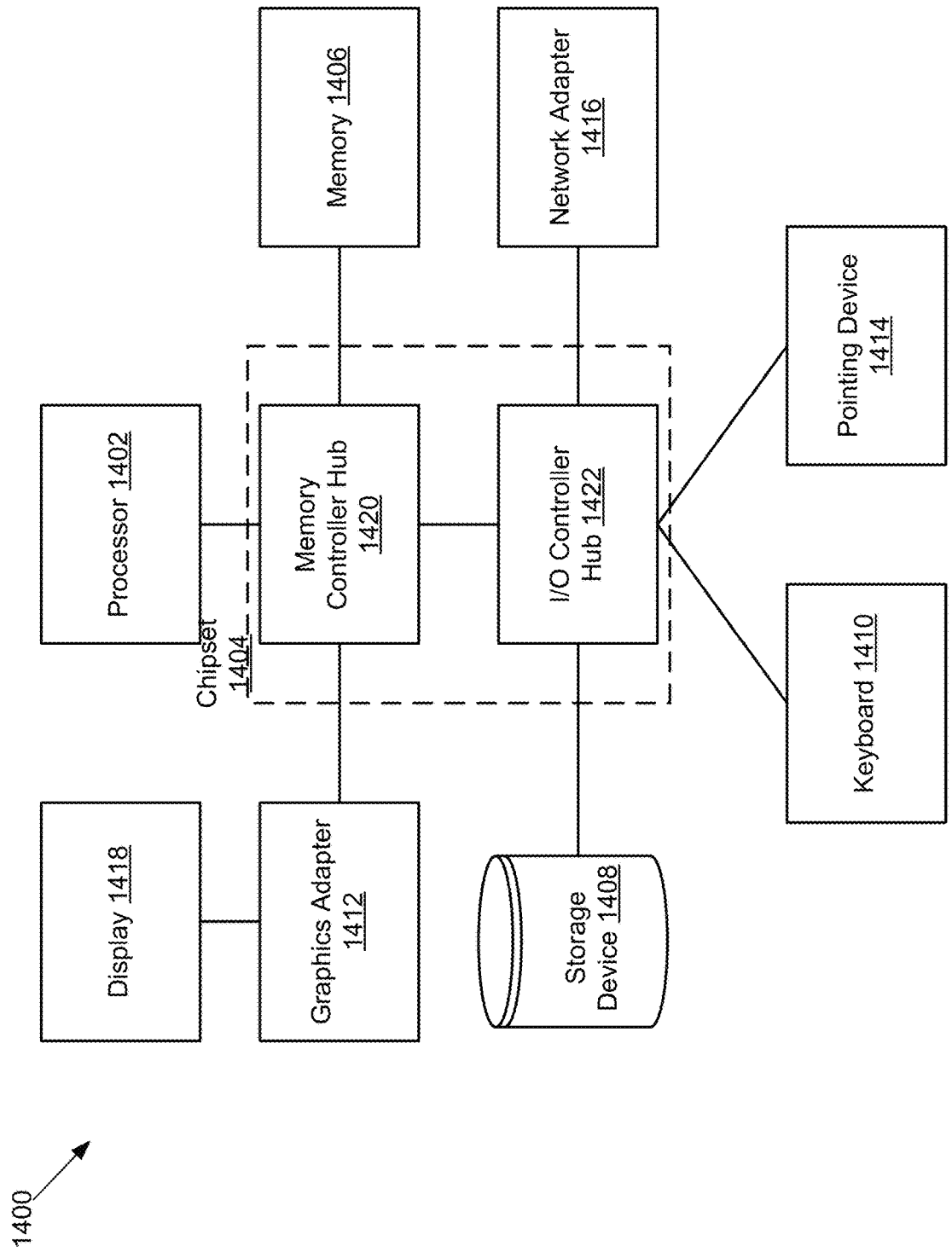
FIG. 14 is a high-level block diagram illustrating physical components of a computer used by one or more of the entities illustrated in the above figures, according to one embodiment.

FIG. 14 is a high-level block diagram illustrating example, physical components of a computer 1400 used by one or more of the entities illustrated in FIG. 1 according to one embodiment. It should be recognized that FIG. 14 is merely an example and a computer used to perform the functionality described herein may include other or different components and may omit components. Illustrated in FIG. 14 are at least one processor 1402 coupled to a chipset 1404. Also coupled to the chipset 1404 are a memory 1406, a storage device 1408, a keyboard 1410, a graphics adapter 1412, a pointing device 1414, and a network adapter 1416. A display 1418 is coupled to the graphics adapter 1412. In one embodiment, the functionality of the chipset 1404 is provided by a memory controller hub 1420 and an I/O controller hub 1422. In another embodiment, the memory 1406 is coupled directly to the processor 1402 instead of the chipset 1404.

The processor 1402 includes an arithmetic logic unit, a microprocessor, a general purpose controller or some other processor array to perform computations and to optionally provide electronic display signals to a display device (not shown). The processor 1402 processes data signals and may include various computing architectures including a complex instruction set computer (CISC) architecture, a reduced instruction set computer (RISC) architecture, or an architecture implementing a combination of instruction sets. Although FIG. 14 includes a single processor 1402, multiple processors may be included. It should be recognized that other processors, operating systems, sensors, displays and physical configurations exist and may be used without departing from the disclosure herein.

The memory 1406 is a non-transitory medium. The memory 1406 stores instructions and/or data that may be executed by the processor 1402. The instructions and/or data may include code for performing the techniques described herein. The memory 1406 may be a dynamic random access memory (DRAM) device, a static random access memory (SRAM) device, flash memory or some other memory device known in the art. In some embodiments, the memory 1406 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In one embodiment, one or more of the prediction utility and the monitoring utility (e.g. the Parent and Child softbots) are stored by the memory 1406, executable by the processor 1402.

The storage device 1408 is any non-transitory computer-readable storage medium, such as a hard drive, compact disk read-only memory (CD-ROM), DVD, or a solid-state memory device. The memory 1406 holds instructions and data used by the processor 1402. The pointing device 1414 may be a mouse, track ball, or other type of pointing device, and is used in combination with the keyboard 1410 to input data into the computer 1400. The graphics adapter 1412 displays images and other information on the display 1418. The network adapter 1416 couples the computer system 1400 to a local or wide area network.

As is known in the art, a computer 1400 can have different and/or other components than those shown in FIG. 14. In addition, the computer 1400 can lack certain illustrated components. In one embodiment, a computer 1400 acting as a server may lack a keyboard 1410, pointing device 1414, graphics adapter 1412, and/or display 1418. Moreover, the storage device 1408 can be local and/or remote from the computer 1400 (such as embodied within a storage area network (SAN)).

As is known in the art, the computer 1400 is adapted to execute computer program modules for providing functionality described herein. As used herein, the term "module" refers to computer program logic utilized to provide the specified functionality. Thus, a module can be implemented in hardware (e.g. as a field-programmable gate array (FPGA) or an application specific integrated circuit (ASIC)), firmware, software or a combination thereof. In one embodiment, program modules are stored on the storage device 1408, loaded into the memory 1406, and executed by the processor 1402.

Embodiments of the entities described herein can include other and/or different modules than the ones described here. In addition, the functionality attributed to the modules can be performed by other or different modules in other embodiments.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect may not be mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Also, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims.

Furthermore, to the extent that the term "includes" or "present" is used in either the detailed description or the claims, such term is intended to be inclusive in a manner similar to the term "comprising" as "comprising" is interpreted when employed as a transitional word in a claim.

We claim:

1. A method comprising:
   receiving, using one or more processors, a first request from a user to generate a knowledge list of information corresponding to one or more business events associated with one or more business ontologies;
   collecting, using the one or more processors, data analytics on the one or more business events;
   receiving, using the one or more processors, a prior set of knowledge describing a set of conceptual dependencies between the one or more business events;
   generating, using the one or more processors, for presentation to the user, the knowledge list of information, the knowledge list of information including a knowledge frame and a document organizer, the knowledge frame summarizing a chronological unfolding of an individual business event through a plurality of stages using a stream of text messages and the document organizer collating a set of non-repetitive documents corroborating the stream of text messages in the knowledge frame based on processing the data analytics;

generating, using the one or more processors, a current hypothesis corresponding to a sentiment about the one or more business events based on intersecting the prior set of knowledge, the knowledge frame in the knowledge list of information, and a previous hypothesis;

receiving, using the one or more processors, a natural language query from the user for interacting with the knowledge list of information; and generating, using the one or more processors, for presentation to the user, a response from the knowledge list of information using the current hypothesis.

2. The method of claim 1, wherein the one or more business events are categorized as one or more of a plurality of business categories as leadership change, new offering, acquisition, merger, partnership, expanding operation, cost cutting, outperforming, underperforming, company presentation, litigation, compliance, research & development, data security, funding development, bankruptcy, restructuring, real estate deal, real estate construction, an intellectual property portfolio, and new offering.

3. The method of claim 1, wherein the one or more business ontologies comprises one or more of business enterprises, business executives, business enterprises' products, revenue, technology, and shares.

4. The method of claim 1, wherein the data analytics is generated by one or more data analytics tools and wherein the one or more data analytics tools comprises one or more from a group of: a recommender recommending one or more connections with a business executive of a business enterprise, a predictive logic tool generating a prediction about the one or more business events associated with one or more business ontologies, a prediction monitoring tool reporting a strengthening or a weakening of the one or more business events, and a sales cycle monitoring logic measuring a sales cycle of a business enterprise and generating a prediction on a successful completion of a sales cycle with the business enterprise.

5. The method of claim 4, wherein the data analytics are output of the one or more data analytics tools, wherein the one or more data analytics tools generate the output by processing one or more data sources, and wherein the one or more data sources comprise one or more from a group of news sites, blogs, social network, web documents, and application about events.

6. The method of claim 1, wherein the knowledge frame in the knowledge list of information corresponding to the one or more business events is generated based on populating the data analytics into corresponding one or more business categories in a chronological order, wherein the knowledge frame includes a text message, wherein the text message is a string of information about a business event of a business category and a subcategory within the business category.

7. The method of claim 1, wherein the prior set of knowledge about the one or more business events is a set of conceptual dependencies between one or more business categories, one or more sub categories, and the one or more business ontologies, and wherein the prior set of knowledge is represented by one from a group of conceptual graph, a semantic net, and a RFD database.

8. The method of claim 1, wherein the current hypothesis corresponding to the sentiment about the one or more business events is a new set of conceptual dependencies.

9. The method of claim 1, further comprising:
receiving a second request from the user for comparing a first knowledge list of a first business ontology with a second knowledge list of a second business ontology; and generating, for presentation to the user, a juxtaposition of the first knowledge list of the first business ontology and the second knowledge list of the second business ontology.

10. The method of claim 1, wherein the document organizer in the knowledge list of information is generated by:
extracting a set of total text messages from a set of documents;
determining whether the set of total text messages include more information than the prior set of knowledge and the set of documents is a subset of the set of total text messages;
responsive to determining that the set of total text messages include more information that the prior set of knowledge and the set of documents is a subset of the set of total text messages, generating the set of non-repetitive documents in the document organizer that corroborate the knowledge frame on the one or more business events; and
associating the set of non-repetitive documents in the document organizer with the knowledge frame on the one or more business events.

11. A system comprising:
a memory; and
a processor operatively coupled to the memory, the processor configured to perform the steps of:
receive a first request from a user to generate a knowledge list of information corresponding to one or more business events associated with one or more business ontologies;
collect data analytics on the one or more business events;
receive a prior set of knowledge describing a set of conceptual dependencies between the one or more business events;
generate, for presentation to the user, the knowledge list of information, the knowledge list of information including a knowledge frame and a document organizer, the knowledge frame summarizing a chronological unfolding of an individual business event through a plurality of stages using a stream of text messages and the document organizer collating a set of non-repetitive documents corroborating the stream of text messages in the knowledge frame based on processing the data analytics;
generate a current hypothesis corresponding to a sentiment about the one or more business events based on intersecting the prior set of knowledge, the knowledge frame in the knowledge list of information, and a previous hypothesis;
receive a natural language query from the user for interacting with the knowledge list of information; and
generate, for presentation to the user, a response from the knowledge list of information using the current hypothesis.

12. The system of claim 11, wherein the one or more business events are categorized as one or more of a plurality of business categories as leadership change, new offering, acquisition, merger, partnership, expanding operation, cost cutting, outperforming, underperforming, company presentation, litigation, compliance, research & development, data security, funding development, bankruptcy, restructuring, real estate deal, real estate construction, an intellectual property portfolio, and new offering.

13. The system of claim 11, wherein the one or more business ontologies comprises one or more of business enterprises, business executives, business enterprises' products, revenue, technology, and shares.

14. The system of claim 11, wherein the data analytics is generated by one or more data analytics tools and wherein the one or more data analytics tools comprises one or more from a group of: a recommender recommending one or more connections with a business executive of a business enterprise, a predictive logic tool generating a prediction about the one or more business events associated with one or more business ontologies, a prediction monitoring tool reporting a strengthening or a weakening of the one or more business events, and a sales cycle monitoring logic measuring a sales cycle of a business enterprise and generating a prediction on a successful completion of a sales cycle with the business enterprise.

15. The system of claim 14, wherein the data analytics are output of the one or more data analytics tools, wherein the one or more data analytics tools generate the output by processing one or more data sources, and wherein the one or more data sources comprise one or more from a group of news sites, blogs, social network, web documents, and application about events.

16. The system of claim 11, wherein the knowledge frame in the knowledge list of information corresponding to the one or more business events is generated based on populating the data analytics into corresponding one or more business categories in a chronological order, wherein the knowledge frame includes a text message, wherein the text message is a string of information about a business event of a business category and a subcategory within the business category.

17. A computer program product comprising a non-transitory computer-readable medium storing a computer readable program, wherein the computer readable program when executed on a computer causes the computer to:
  receive a first request from a user to generate a knowledge list of information corresponding to one or more business events associated with one or more business ontologies;
  collect data analytics on the one or more business events;
  receive a prior set of knowledge describing a set of conceptual dependencies between the one or more business events;
  generate, for presentation to the user, the knowledge list of information, the knowledge list of information including a knowledge frame and a document organizer, the knowledge frame summarizing a chronological unfolding of an individual business event through a plurality of stages using a stream of text messages and the document organizer collating a set of non-repetitive documents corroborating the stream of text messages in the knowledge frame based on processing the data analytics;
  generate a current hypothesis corresponding to a sentiment about the one or more business events based on intersecting the prior set of knowledge, the knowledge frame in the knowledge list of information, and a previous hypothesis;
  receive a natural language query from the user for interacting with the knowledge list of information; and
  generate, for presentation to the user, a response from the knowledge list of information using the current hypothesis.

18. The computer program product of claim 17, wherein the one or more business events are categorized as one or more of a plurality of business categories as leadership change, new offering, acquisition, merger, partnership, expanding operation, cost cutting, outperforming, underperforming, company presentation, litigation, compliance, research & development, data security, funding development, bankruptcy, restructuring, real estate deal, real estate construction, an intellectual property portfolio, and new offering.

19. The computer program product of claim 17, wherein the one or more business ontologies comprises one or more of business enterprises, business executives, business enterprises' products, revenue, technology, and shares.

20. The computer program product of claim 17, wherein the data analytics is generated by one or more data analytics tools and wherein the one or more data analytics tools comprises one or more from a group of: a recommender recommending one or more connections with a business executive of a business enterprise, a predictive logic tool generating a prediction about the one or more business events associated with one or more business ontologies, a prediction monitoring tool reporting a strengthening or a weakening of the one or more business events, and a sales cycle monitoring logic measuring a sales cycle of a business enterprise and generating a prediction on a successful completion of a sales cycle with the business enterprise.

\* \* \* \* \*